(12) United States Patent
Konishi

(10) Patent No.: US 9,395,930 B2
(45) Date of Patent: Jul. 19, 2016

(54) INFORMATION PROCESSING SYSTEM, CONTROL METHOD OF INFORMATION PROCESSING SYSTEM, AND RECORDING MEDIUM

(71) Applicant: FUJITSU LIMITED, Kawasaki-shi, Kanagawa (JP)

(72) Inventor: Yotaro Konishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/636,622

(22) Filed: Mar. 3, 2015

(65) Prior Publication Data

US 2015/0277801 A1    Oct. 1, 2015

(30) Foreign Application Priority Data

Mar. 28, 2014    (JP) .................................. 2014-069110

(51) Int. Cl.
  *G06F 3/06*     (2006.01)
  *G06F 19/20*    (2011.01)
  *G11B 19/20*    (2006.01)

(52) U.S. Cl.
  CPC ............ *G06F 3/0625* (2013.01); *G06F 3/0634* (2013.01); *G06F 3/0652* (2013.01); *G06F 3/0665* (2013.01); *G06F 3/0689* (2013.01); *G11B 19/209* (2013.01); *G06F 2003/0692* (2013.01)

(58) Field of Classification Search
  None
  See application file for complete search history.

(56) References Cited

U.S. PATENT DOCUMENTS

| 8,122,217 B2 * | 2/2012 | Naor ..................... G06F 1/3203 711/154 |
| 2006/0179209 A1 * | 8/2006 | Wang .................... G06F 3/0625 711/101 |
| 2009/0249001 A1 * | 10/2009 | Narayanan ............ G06F 1/3203 711/161 |
| 2009/0249104 A1 | 10/2009 | Ikeda et al. |
| 2010/0174865 A1 * | 7/2010 | Koester ................... G06F 21/80 711/114 |
| 2010/0238574 A1 * | 9/2010 | Balasubramanian . G06F 3/0625 360/15 |

(Continued)

FOREIGN PATENT DOCUMENTS

| JP | 2002-297320 | 10/2002 |
| JP | 2005-107856 | 4/2005 |
| JP | 2009-238159 | 10/2009 |

OTHER PUBLICATIONS

Bisson et al. "A Distributed Spin-Down Algorithm for an Object-Based Storage Device with Write Redirection." Jan. 2006. Proceedings of the 7th Workshop on Distributed Data and Structures (WDAS '06). pp. 1-13.*

(Continued)

*Primary Examiner* — Nathan Sadler
(74) *Attorney, Agent, or Firm* — Staas & Halsey LLP

(57) ABSTRACT

An information processing system includes a plurality of information processing apparatuses, a management apparatus that manages the plurality of information processing apparatuses, and a device that is to be coupled with the management apparatus. Each of the plurality of the information processing apparatus includes a plurality of disk device group, each of which includes a plurality of disk devices. The management apparatus assigns a request received from the device to any one of the plurality of disk device groups. Each of the plurality of information processing apparatuses holds data management information including data size of data to be deleted according to the request, and deletes data stored in the plurality of disk devices when a summation of data sizes included in the data management information exceeds a threshold value.

15 Claims, 23 Drawing Sheets

(56) References Cited

U.S. PATENT DOCUMENTS

| | | | |
|---|---|---|---|
| 2011/0258411 A1* | 10/2011 | Sato | G06F 3/0623 711/165 |
| 2014/0195762 A1* | 7/2014 | Colgrove | G06F 3/0619 711/166 |
| 2015/0103429 A1* | 4/2015 | Konishi | G06F 3/0611 360/55 |
| 2015/0106562 A1* | 4/2015 | Helmer | G06F 3/0652 711/114 |

OTHER PUBLICATIONS

Mandagere et al. "GreenStor: Application-Aided Energy-Efficient Storage." Sep. 2007. IEEE. MSST 2007.*

Wang et al. "eRAID: Conserving Energy in Conventional Disk-Based RAID System." Mar. 2008. IEEE. IEEE Transactions on Computers. vol. 57. pp. 359-374.*

Narayanan et al. "Write Off-Loading: Practical Power Management for Enterprise Storage." Nov. 2008. pp. 10:1-10:23.*

* cited by examiner

FIG. 2

| HASH VALUE | MAGNETIC DISK DEVICE GROUP |
|---|---|
| 00b | Ga0, Gb0, Gc0 |
| 01b | Ga1, Gb1, Gc1 |
| 10b | Ga2, Gb2, Gc2 |
| 11b | Ga3, Gb3, Gc3 |

HATBL

| DISK GROUP NAME | IP ADDRESS |
|---|---|
| Ga0 | 192.168.1.2 |
| Ga1 | 192.168.1.2 |
| Ga2 | 192.168.1.2 |
| Ga3 | 192.168.1.2 |
| Gb0 | 192.168.1.3 |
| Gb1 | 192.168.1.3 |
| Gb2 | 192.168.1.3 |
| Gb3 | 192.168.1.3 |
| Gc0 | 192.168.1.4 |
| Gc1 | 192.168.1.4 |
| Gc2 | 192.168.1.4 |
| Gc3 | 192.168.1.4 |

FIG. 6

DGTBL

| DISK GROUP NAME | ACTIVE ORDER | DISK ID | MOUNT POINT | ACTIVE NUMBER |
|---|---|---|---|---|
| Ga0 | 0 | A0 | /mnt/devA0 | 1 |
| | 1 | A4 | /mnt/devA4 | |
| | 2 | A8 | /mnt/devA8 | |
| | 3 | A12 | /mnt/devA12 | |
| | 4 | A16 | /mnt/devA16 | |
| Ga1 | 0 | A1 | /mnt/devA1 | 1 |
| | 1 | A5 | /mnt/devA5 | |
| | 2 | A9 | /mnt/devA9 | |
| | 3 | A13 | /mnt/devA13 | |
| | 4 | A17 | /mnt/devA17 | |
| Ga2 | 0 | A2 | /mnt/devA2 | 1 |
| | 1 | A6 | /mnt/devA6 | |
| | 2 | A10 | /mnt/devA10 | |
| | 3 | A14 | /mnt/devA14 | |
| | 4 | A18 | /mnt/devA18 | |
| Ga3 | 0 | A3 | /mnt/devA3 | 1 |
| | 1 | A7 | /mnt/devA7 | |
| | 2 | A11 | /mnt/devA11 | |
| | 3 | A15 | /mnt/devA15 | |
| | 4 | A19 | /mnt/devB19 | |

FIG. 7

| PATH OF DATA | STORAGE DISK ID | DATA SIZE |
|---|---|---|
| /a/b/c.txt | A0 | 1KB |
| /x/y/z.jpg | A2 | 2GB |
| /foo/bar/buz.jpg | A0 | 5GB |
| ⋮ | ⋮ | ⋮ |
| /foo/bar/foobar.jpg | A3 | 4GB |
| /one/two/three.zip | A5 | 100MB |
| /a/b/f.txt | A4 | 2KB |
| | | |
| | | |
| | | |
| | | |
| ⋮ | ⋮ | ⋮ |

DMTBL

SUBSEQUENT TO S712
NOW=A4

| DISK GROUP NAME | ACTIVE ORDER | DISK ID | MOUNT POINT | ACTIVE NUMBER |
|---|---|---|---|---|
| Ga0 | 0 | A0 | /mnt/devA0 | 1 |
| | 1 | A4 | /mnt/devA4 | |
| | 2 | A8 | /mnt/devaA8 | |
| | 3 | A12 | /mnt/devA12 | |
| | 4 | A16 | /mnt/devA16 | |

DGTBL (B)

SUBSEQUENT TO S714
NOW=A4

| DISK GROUP NAME | ACTIVE ORDER | DISK ID | MOUNT POINT | ACTIVE NUMBER |
|---|---|---|---|---|
| Ga0 | 1 | A4 | /mnt/devA4 | 1 |
| | 0 | A0 | /mnt/devA0 | |
| | 2 | A8 | /mnt/devaA8 | |
| | 3 | A12 | /mnt/devA12 | |
| | 4 | A16 | /mnt/devA16 | |

(C)

SUBSEQUENT TO S716
NOW=A4

| DISK GROUP NAME | ACTIVE ORDER | DISK ID | MOUNT POINT | ACTIVE NUMBER |
|---|---|---|---|---|
| Ga0 | 0 | A4 | /mnt/devA4 | 1 |
| | 1 | A0 | /mnt/devA0 | |
| | 2 | A8 | /mnt/devaA8 | |
| | 3 | A12 | /mnt/devA12 | |
| | 4 | A16 | /mnt/devA16 | |

(D)

SUBSEQUENT TO S718
NOW=A4

| DISK GROUP NAME | ACTIVE ORDER | DISK ID | MOUNT POINT | ACTIVE NUMBER |
|---|---|---|---|---|
| Ga0 | 0 | A4 | /mnt/devA4 | 0 |
| | 1 | A0 | /mnt/devA0 | |
| | 2 | A8 | /mnt/devaA8 | |
| | 3 | A12 | /mnt/devA12 | |
| | 4 | A16 | /mnt/devA16 | |

FIG. 22

| HASH VALUE | MAGNETIC DISK DEVICE GROUP |
|---|---|
| 000b | Ga0, Gc0 |
| 001b | Ga1, Gc1 |
| 010b | Ga2, Gc2 |
| 011b | Ga3, Gc3 |
| 100b | Gb0, Gd0 |
| 101b | Gb1, Gd1 |
| 110b | Gb2, Gd2 |
| 111b | Gb3, Gd3 |

HATBL2

Rows 000b–011b: SSVa, SSVc
Rows 100b–111b: SSVb, SSVd

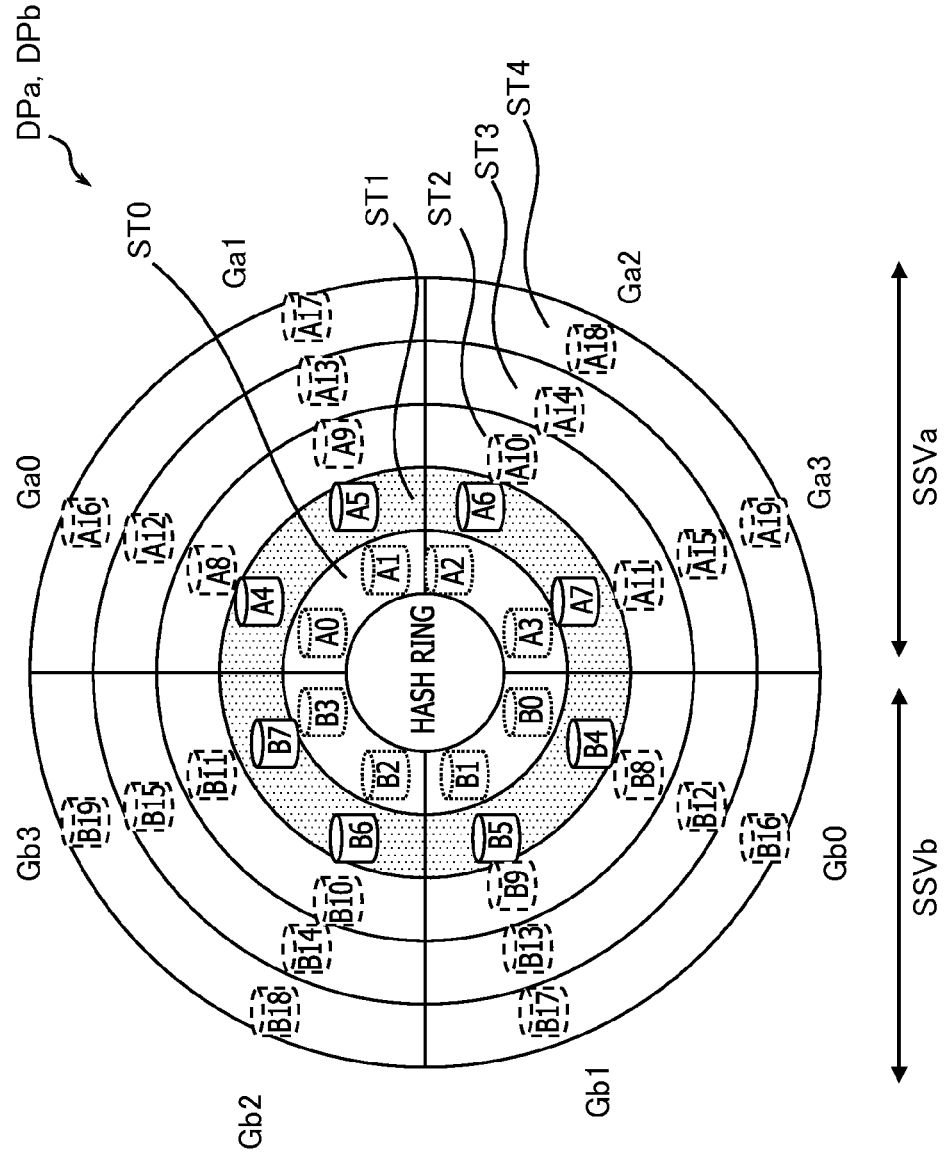

INFORMATION PROCESSING SYSTEM, CONTROL METHOD OF INFORMATION PROCESSING SYSTEM, AND RECORDING MEDIUM

CROSS-REFERENCE TO RELATED APPLICATION

This application is based upon and claims the benefit of priority from the prior Japanese Patent Application No. 2014-069110 filed on Mar. 28, 2014, the entire contents of which are incorporated herein by reference.

FIELD

The embodiment discussed herein is related to an information processing system, a control method of the information processing system, and a recording medium.

BACKGROUND

A technique has been proposed in which a mode is transitioned to an energy saving mode when data is overwritten to be deleted with reference to a management table in which information on data to be deleted from a disk device is registered, and then access is not performed for a predetermined time in a state where information indicating data to be deleted is absent in the management table.

A technique has been proposed in which a request is registered in an execution waiting task, a storage system returns to the normal mode, and then a logical volume is deleted according to the task including the registered request when a request for deleting of the logical volume is made in an energy saving mode in the storage system.

A technique has been proposed in which a mode of a disk device is transitioned to a power saving mode when the load level is equal to or less than a threshold value, and a situation in which a load is imposed onto a disk device is monitored. Examples of related documents in the related art are Japanese Laid-open Patent Publications Nos. 2005-107856, 2009-238159, and 2002-297320.

SUMMARY

According to an aspect of the invention, an information processing system includes a plurality of information processing apparatuses, a management apparatus that manages the plurality of information processing apparatuses, and a device that is to be coupled with the management apparatus. Each of the plurality of the information processing apparatus includes a plurality of disk device group, each of which includes a plurality of disk devices. The management apparatus assigns a request received from the device to any one of the plurality of disk device groups. Each of the plurality of information processing apparatuses holds data management information including data size of data to be deleted according to the request, and deletes data stored in the plurality of disk devices when a summation of data sizes included in the data management information exceeds a threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a hash table illustrated in FIG. 1;

FIG. 6 is a diagram illustrating an example of a disk group table illustrated in FIG. 1;

FIG. 7 is a diagram illustrating an example of a data management table illustrated in FIG. 1;

FIG. 16 is a diagram illustrating an example of the change of information stored in the disk group table in the delete process of data in FIG. 15;

FIG. 22 is a diagram illustrating an example of a hash table illustrated in FIG. 21; and FIG. 23 is a diagram illustrating an example of a hash ring of a disk pool illustrated in FIG. 21.

DESCRIPTION OF EMBODIMENT

For example, data stored in a magnetic disk device subject to spin-down by a transition into an energy saving mode is deleted after the magnetic disk device is subject to spin-up and returns to a normal mode. When a request for deleting data is repeatedly generated, and the spin-up and the spin-down are frequently performed, the disk device becomes to be degraded.

An object of an information processing system, a control method of the information processing system and a control program of an information processing apparatus according to this disclosure is to suppress degradation of the disk device by decreasing frequency of the spin-up and the spin-down in the disk device when data stored in a magnetic disk device is deleted.

Figure 1:
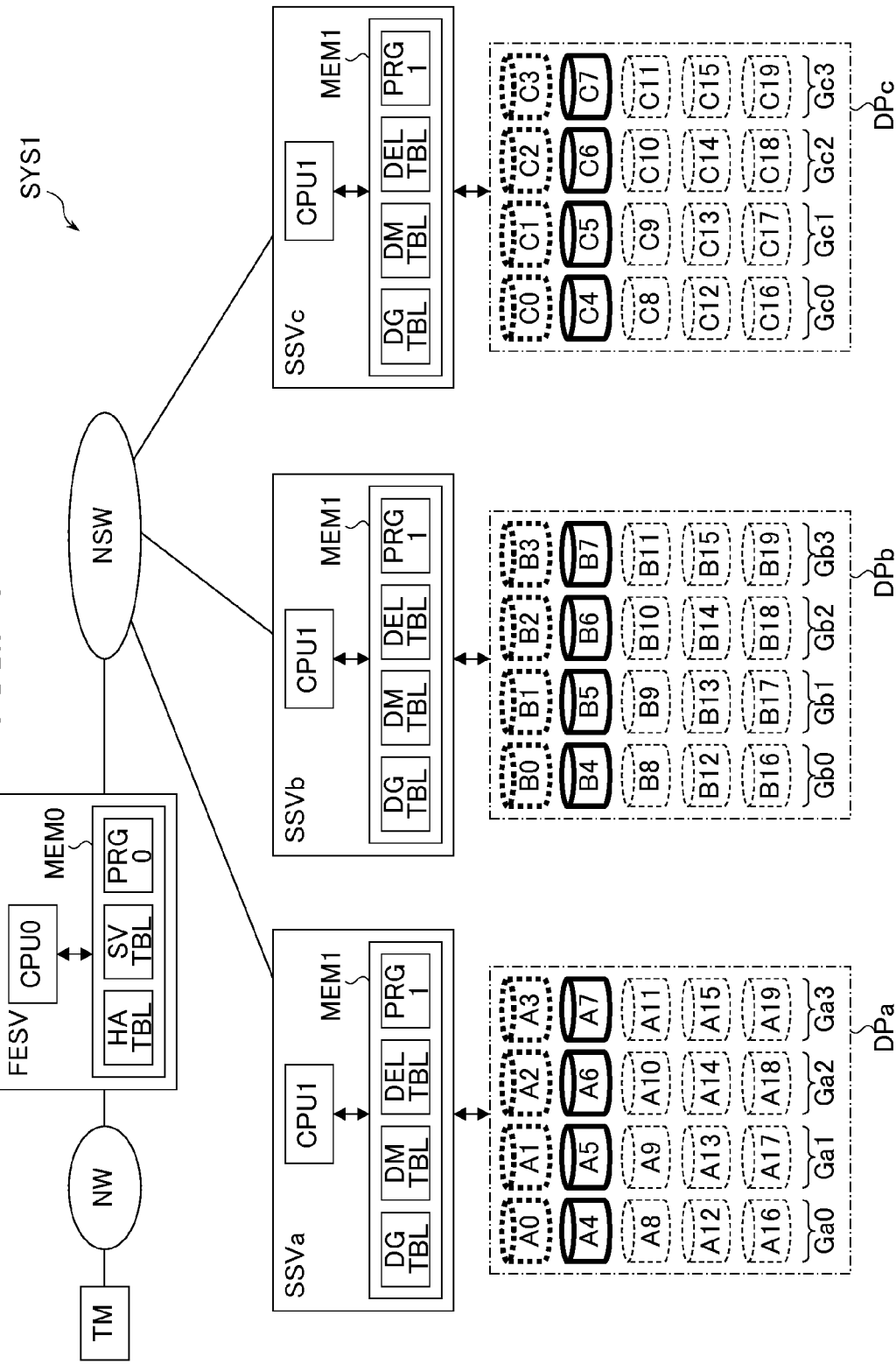
FIG. 1 is a diagram illustrating an information processing system, a control method of the information processing system, and a control program of an information processing apparatus according to an embodiment.

FIG. 1 is a diagram illustrating an information processing system, a control method of the information processing system, and a control program of an information processing apparatus according to an embodiment.

The information processing system SYS1 illustrated in FIG. 1 according to the embodiment includes a front-end server FESV, storage servers SSV (SSVa, SSVb, and SSVc), disk pools DP (DPa, DPb, and DPc), and a terminal device TM. For example, the front-end server FESV is coupled with the storage servers SSVa, SSVb, and SSVc through a network switch NSW. For example, the network switch NSW is a layer-2 switch when the front-end server FESV is coupled with the storage servers SSVa, SSVb, and SSVc through a local area network (LAN). The front-end server FESV is coupled with the terminal device TM through a network NW such as the internet or an intranet. The front-end server FESV may be coupled with the storage servers SSV without the network switch NSW, and may be coupled with the terminal device TM without the network NW.

The terminal device TM is included in a computer device that runs an application program using the information processing system SYS1 as a network storage system, or a user computer to use the application program. The information processing system SYS1 may be coupled with a plurality of the terminal devices TM through the network NW. For example, the information processing system SYS1 is used in an object storage service of managing data as an object or a cloud storage service constructed by object storage.

The disk pool DPa includes a plurality of magnetic disk device groups Ga (Ga0, Ga1, Ga2, and Ga3), and each magnetic disk device group includes a plurality of disk devices A (A0 to A19). The disk pool DPb includes a plurality of magnetic disk device groups Gb (Gb0, Gb1, Gb2, and Gb3), and each magnetic disk device group includes a plurality of disk devices B (B0 to B19). The disk pool DPc includes a plurality of magnetic disk device groups Gc (Gc0, Gc1, Gc2, and Gc3), and each magnetic disk device group includes a plurality of disk devices C (C0 to C19).

The disk pool DP may include the magnetic disk device groups Ga, Gb, and Gc. The magnetic disk device group Ga may be included in the storage server SSVa, the magnetic disk device group Gb may be included in the storage server SSVb, and the magnetic disk device group Gc may be included in the storage server SSVc. The number of each of the magnetic disk device groups is not limited to four, the number of each of the disk devices A, B, and C is not limited to 20, and the number of the disk devices A, B, and C included in each of the magnetic disk device groups Ga, Gb, and Gc is not limited to five.

For example, the information processing system SYS1 illustrated in FIG. 1 stores data in each of the disk devices A, B, and C included in the disk pools DPa, DPb, and DPc. That is, the information processing system SYS1 holds three data groups (replica data) with redundancy in the disk pools DPa, DPb, and DPc.

The disk devices A4 to A7, B4 to B7, and C4 to C7 indicated by bold solid lines illustrate that the disk devices are in a spin-up state where the disk device maintains a rotating state of a spindle motor for rotating a disc (also referred to a platter). The information processing system SYS1 classifies each of the disk device groups A0 to A19, B0-B19, and C0-C19 in the disk device in an active state, which is a data writing subject, and the disk device in an inactive state, which is not a data writing subject. The disk device in the active state is in the spin-up state, and preparation for writing data is completed. For example, the disk device in the active state is completed to be mounted on a file system, and allows an operating system to access a file. That is, the disk devices A4 to A7, B4 to B7, and C4 to C7 in the active state are in the spin-up state, and are mounted on the file system. The disk devices A8 to A19, B8 to B19, and C8 to C19 indicated by thin broken lines are in a spin-down state where the spindle motor stops rotating. The disk devices A8 to A19, B8 to B19, and C8 to C19 in the spin-down state are in the inactive state where the disk device is unmounted from the file system. The magnetic disk devices A0 to A3, B0 to B3, and C0 to C3 indicated by bold broken lines illustrate that the magnetic disk devices store data of which amount is greater than a predetermined amount (second threshold value illustrated in FIG. 13) and set to be in the spin-down state.

For example, when data having a predetermined amount is stored in the disk devices A4 to A7 in the active state, the disk devices A4 to A7 are set to be in the inactive state, and the disk devices A8 to A11 are set to be in the active state. An order of setting the disk devices A0 to A19 to be in the active state is described in FIGS. 6 and 17. Then, data transmitted from the terminal device TM is stored in the disk devices A8 to A11. The disk devices B4 to B7, and C4 to C7 are also set to be in the inactive state when data having a predetermined amount is stored, similarly to the disk devices A4 to A7. The power consumption of the processing system SYS1 may be suppressed by restricting the number of the disk devices A, B, and C.

The front-end server FESV controls the storage servers SSV, and operates the storage servers SSV and the disk devices A, B, and C included in the disk pool DP as a network storage, based on a request from the terminal device TM. The request from the terminal device TM includes a writing request of data, a delete request of data, and a reading request of data.

The storage server SSV executes a writing process on new data in the disk devices A, B and C, based on a writing request of the new data. The storage server SSV executes an updating process of data, based on a writing request for rewriting a data stored in the disk devices A, B and C. The storage server SSV executes a delete process on data, and a writing process on data in the updating process. The storage server SSV does not immediately delete data, based on a delete request for deleting data stored in the disk devices A, B, and C. The storage server SSV executes a delete process on data based on an amount of the data to be deleted being greater than the predetermined amount. FIGS. 13 to 17 illustrate examples of a writing process on data, an updating process on data, and a delete process on data that are executed by the storage server SSV.

The front-end server FESV includes a central processing unit (CPU) 0 as a processor, and a memory MEM0 including an area in which a hash table HATBL, a server table SVTBL, and a program PRG0 are stored. The program PGM0 is executed by the processor CPU0, and realizes functions of the front-end server FESV. The front-end server FESV is an example of a management apparatus of managing the storage servers SSVa, SSVb, and SSVc.

For example, information is stored in the hash table HATBL, and the information indicates a piece of information obtained by associating a hash value obtained based on data transmitted from the terminal device TM and the disk devices A0 to A19. For example, the front-end server FESV inputs an identifier for identifying data transmitted from the terminal device TM (for example, a pathname or a file name of the data) to a hash function, and thus achieves a hash value. The front-end server FESV determines the magnetic disk device group Ga to store the data, based on the achieved hash value. For example, the magnetic disk device groups Ga0, Ga1, Ga2, and Ga3 are allocated to hash spaces different from each other. Similarly, the magnetic disk device groups Gb0, Gb1, Gb2, and Gb3 are allocated to hash spaces different from each other, and the magnetic disk device groups Gc0, Gc1, Gc2, and Gc3 are allocated to hash spaces different from each other. FIG. 2 illustrates an example of the hash table HATBL.

Figure 5:
FIG. 5 is a diagram illustrating an example of a server table illustrated in FIG. 1.

For example, information is stored in the server table SVTBL, the information indicates a piece of information obtained by associating the magnetic disk device groups Ga, Gb, and Gc and the storage servers SSV that are coupled with the magnetic disk device groups Ga, Gb, and Gc. FIG. 5 illustrates an example of the server table SVTBL.

The respective storage servers SSV include a processor CPU1, and a memory MEM1 including an area in which a disk group table DGTBL, a data management table DMTBL, a delete table DELTBL, and a program PRG1 are stored. The program PRG1 is executed by the processor CPU1 and realizes functions of the respective storage servers SSV. The storage servers SSV that respectively include the magnetic disk device groups Ga, Gb, and Gc are an example of the information processing apparatus. The storage servers SSVa, SSVb, and SSVc have a configuration the same as or similar to each other, and thus the storage server SSVa in FIG. 1 will be described below. The storage servers SSVb, and SSVc may be described by substituting the reference sign "a" with the reference sign "b" or the reference sign "c".

Information indicating an order of setting the disk device A to be in the active state (active order), and information indicating the disk device A in the active state at present are stored in the disk group table DGTBL for every magnetic disk device groups Ga0 to Ga3. FIG. 6 illustrates an example of the disk group table DGTBL.

Information identifying data, and information indicating the disk device A in which the data is stored are stored in the data management table TMTBL for each data. FIG. 7 illustrates an example of the data management table TMTBL.

Figure 8:
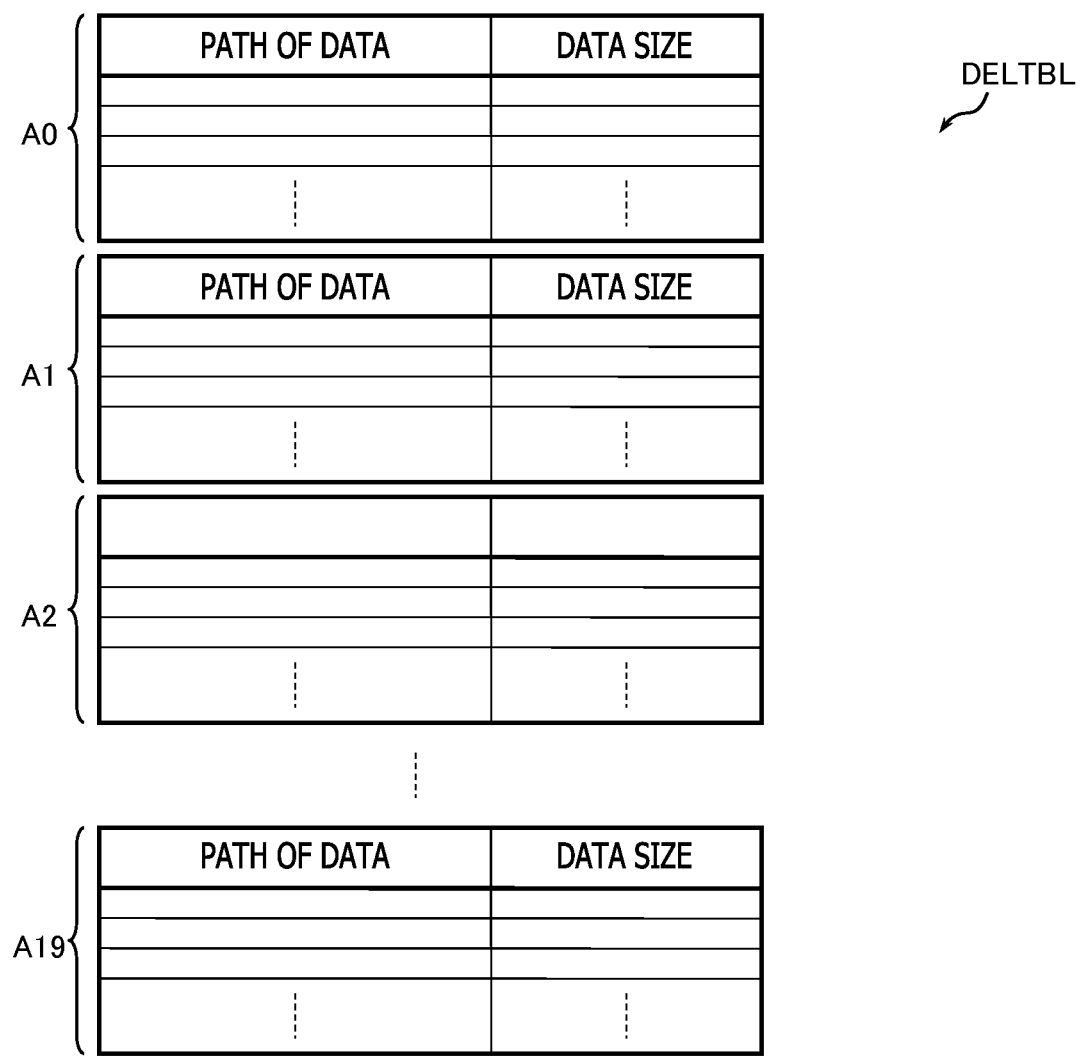
FIG. 8 is a diagram illustrating an example of a delete table illustrated in FIG. 1.

Information identifying data to be deleted, and information indicating a size of the data to be deleted are stored in the delete table DELTBL. The storage server SSVa holds information indicating data to be deleted in the delete table DELTBL until the data is actually deleted. FIG. 8 illustrates an example of the delete table DELTBL.

FIG. 2 is a diagram illustrating an example of the hash table illustrated in FIG. 1. For example, the hash table HATBL includes an area in which information indicating a value indicated by a predetermined number of bits among hash values obtained by the hash function, and information indicating the magnetic disk device group corresponding to the hash value are stored. The hash table HATBL is an example of a request-correspondence table obtained by associating a request from the terminal device TM and magnetic disk device group identification information for identifying each of the magnetic disk device groups Ga0 to Ga3 (or Gb0 to Gb3, or Gc0 to Gc3) based on a predetermined function such as the hash function.

For example, data corresponding to a hash value having higher two bits of "00b" ("b" indicates a binary number) is stored in the magnetic disk device groups Ga0, Gb0, and Gc0. Data corresponding to a hash value having higher two bits of "01b" is stored in the magnetic disk device groups Ga1, Gb1, and Gc1. Data corresponding to a hash value having higher two bits of "10b" is stored in the magnetic disk device groups Ga2, Gb2, and Gc2. Data corresponding to a hash value having higher two bits of "11b" is stored in the magnetic disk device groups Ga3, Gb3, and Gc3. In this manner, the common hash function is applied in the magnetic disk device groups Ga, Gb, and Gc.

In practice, the front-end server FESV generates, for example, a hash value having 128 bits using Message Digest 5 (MD5) as a hash function. The front-end server FESV determines a storing subject of data to be any one of 64 disk devices A, B, and C respectively included in the disk pools DPa, DPb, and DPc, corresponding to higher six bits of the hash value. However, for simple explanation of the description, the number of hash values for distinguishing between the disk pools DPa, DPb, and DPc (that is, hash spaces) are set to 4.

The hash values output from the hash function are equivalently distributed, and thus the magnetic disk device groups Ga, Gb, and Gc are equivalently accessed which are allocated to the hash value. Accordingly, for example, amounts of the data are approximately equivalent, which are respectively stored in the magnetic disk device groups Ga0, Ga1, Gat and Ga3 of the disk pool DPa illustrated in FIG. 1. Similarly, amounts of the data are approximately equivalent, which are respectively stored in the magnetic disk device groups Gb0, Gb1, Gb2, and Gb3, and amounts of the data are approximately equivalent, which are respectively stored in the magnetic disk device groups Gc0, Gc1, Gc2, and Gc3.

Figure 3:
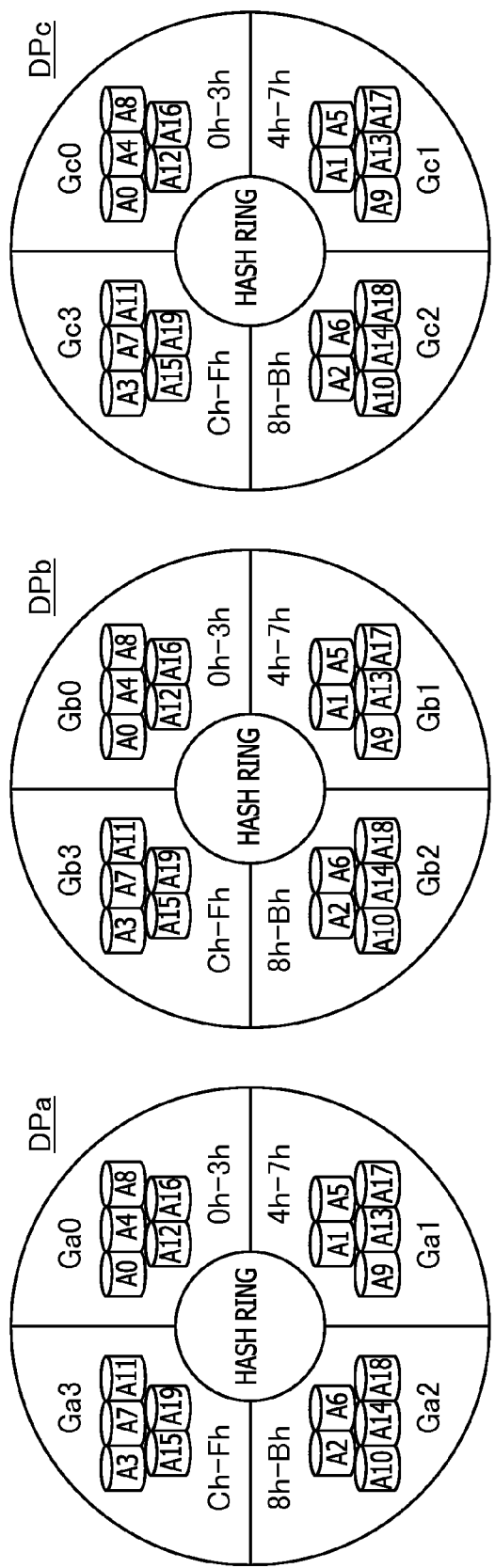
FIG. 3 is a diagram illustrating an example of a hash space indicated by the hash table illustrated in FIG. 2.

FIG. 3 is a diagram illustrating an example of the hash space indicated by the hash table illustrated in FIG. 2. FIG. 3 illustrates the hash spaces as a hash ring. The hash spaces of the disk pools DPa, DPb, and DPc are the same as or similar to each other, and thus the hash space of the disk pool DPa in FIG. 3 will be described below. The hash space of the disk pool DPb, and the hash space of the disk pool DPc may be described by substituting the reference sign "a" with the reference sign "b" or the reference sign "c". For example, the information processing system SYS1 employs a consistent hashing method.

For example, the front-end server FESV illustrated in FIG. 1 achieves the magnetic disk device groups Ga, Gb, and Gc in which data are stored according to the hash value obtained by inputting the identifier for identifying data (for example, a pathname or a file name of the data) to the hash function. The storage destination of data in the disk pool DPa is determined in any one of four hash spaces corresponding to higher two bits of the hash value, as illustrated in FIG. 2.

Figure 4:
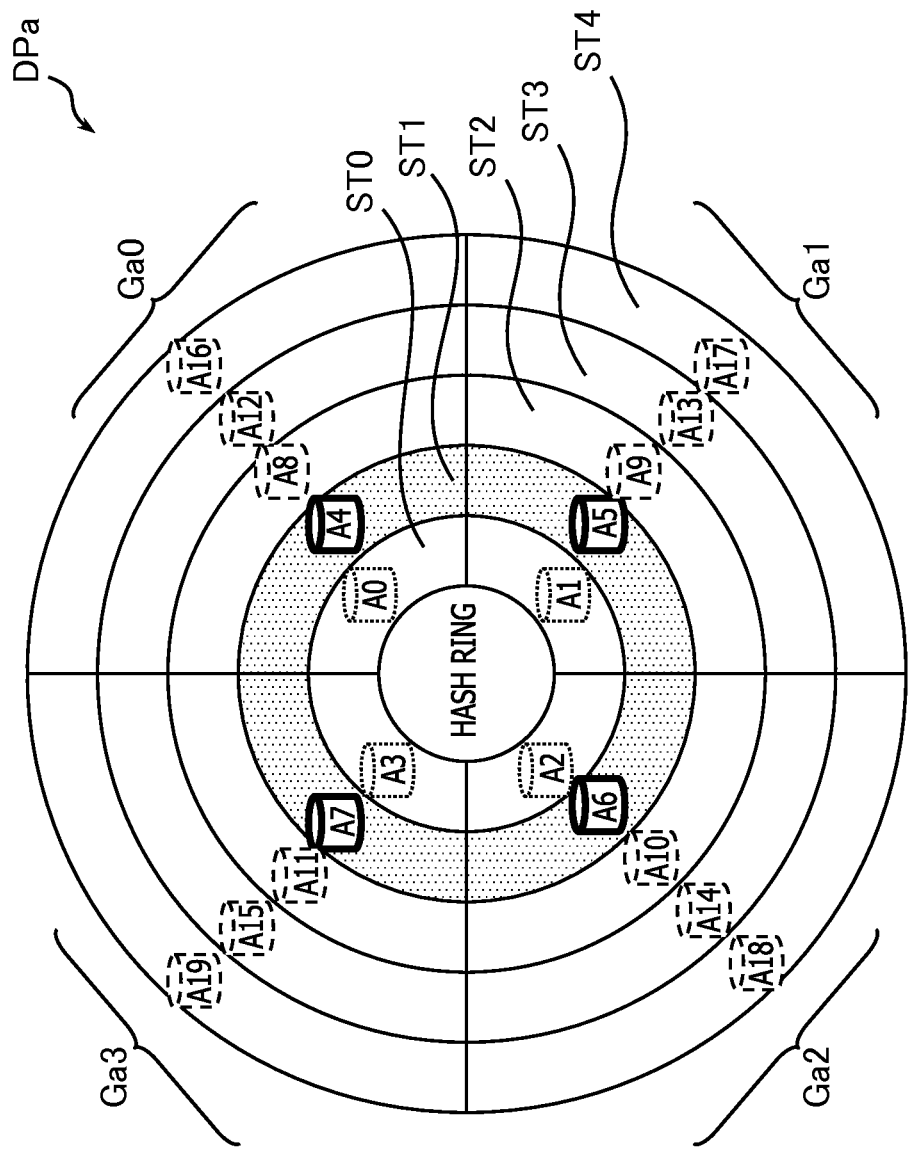
FIG. 4 is a diagram illustrating an example of a hash ring of a disk pool illustrated in FIG. 1.

FIG. 4 illustrates an example of the hash ring of the disk pool DPa illustrated in FIG. 3. In the disk pool DPa, the magnetic disk device A allocated to the hash space is changed for each state ST (ST0, ST1, ST2, ST3, and ST4). That is, the magnetic disk device A corresponding to any one of the states ST0 to ST4 is set to be in the active state, and the magnetic disk device A corresponding to other states is set to be in the inactive state. FIG. 4 illustrates a state of the disk device A illustrated in FIG. 1. The disk devices A4, A5, A6, and A7 corresponding to the state ST1 indicated by shading are set to be in the active state, and other disk devices A0 to A3, A8 to A19 are set to be in the inactive state.

The magnetic disk devices A0 to A3 indicated by bold broken lines belonging to the state ST0 inside the state ST1 where the disk devices are in the active state are depicted as the magnetic disk devices that store data of which an amount is greater than a predetermined amount and are set to be in the spin-down state, as in FIG. 1. The magnetic disk devices A8 to A19 indicated by thin broken lines belonging to the states ST2 to ST4 outside the state ST1 where the disk devices are in the active state are depicted as the disk devices that are in the spin-down state where the spindle motor stops rotating, and have an area where data is stored, as in FIG. 1.

In the disk pools DPb, and DPc, the disk devices B and C allocated to the hash space are also respectively changed for every state of ST0 to ST4, as in FIG. 4. In the disk pool DPb, the magnetic disk device B allocated to the hash space may be depicted by substituting the reference sign "B" for the reference sign "A" of the disk device in FIG. 4. Similarly, in the disk pool DPc, the magnetic disk device C allocated to the hash space may be depicted by substituting the reference sign "C" for the reference sign "A" of the magnetic disk device in FIG. 4.

FIG. 5 illustrates an example of the server table SVTBL illustrated in FIG. 1. Stored in the server table SVTBL is a disk device group name that is the name of the respective magnetic disk device groups Ga, Gb, and Gc included in the information processing system SYS1 and information for identifying the storage server SSV coupled with the magnetic disk device groups Ga, Gb, and Gc. For example, the information for identifying the storage server SSV includes an internet protocol (IP) address that is a number for identifying the storage server SSV over a network.

The information stored in the server table SVTBL is an example of association information obtained by associating magnetic disk device group identification information for identifying the respective magnetic disk device groups Ga, Gb, and Gc and information processing apparatus identification information for identifying the storage servers SSV. For example, the magnetic disk device group identification information has the disk device group name, and the magnetic disk device group identification information has an IP address. The front-end server FESV achieves the storage server SSV coupled with the magnetic disk device groups Ga, Gb, and Gc specified by the hash table HATBL with reference to the server table SVTBL. The front-end server FESV transmits a writing request, a delete request, or a reading request received from the terminal device TM to the achieved storage server SSV.

FIG. 6 illustrates an example of the disk group table DGTBL illustrated in FIG. 1. FIG. 6 illustrates an example of the disk group table DGTBL which the storage server SSVa has. Examples of the disk group table DGTBL which the storage servers SSVb and SSVc respectively have may be illustrated by substituting the reference sign "A" in FIG. 6 with the reference sign "B" or the reference sign "C" and substituting the reference sign "a" in FIG. 6 with the reference sign "b" or the reference sign "c".

The disk group table DGTBL includes an area for indicating the disk group name, an active order, a disk identification (ID), a mount point, and an active number for every disk device A0 to A19. The disk group name is the name of the magnetic disk device group Ga included in the information processing system SYS1, with the server table SVTBL illustrated in FIG. 5. The active order indicates an order of setting the disk devices A to be in the active state, which are assigned to each of the magnetic disk device groups Ga0 to Ga3. For example, the active order corresponds to the number allocated to the states ST illustrated in FIG. 4.

The disk ID is information for identifying the respective disk devices A0 to A19. The mount point indicates a directory where the respective disk devices A0 to A19 are mounted on the file system. The active number indicates the disk device A set to be in the active state to the respective magnetic disk device groups Ga, and is allocated to the respective magnetic disk device groups Ga0 to Ga3. The active number is indicated by a number stored in an area of the active order. FIG. 6 illustrates the disk group table DGTBL when the disk devices A4 to A7 illustrated in FIG. 1 are set to be in the active state (state ST1 in FIG. 4). "1" is set in the area for indicating the active state.

The information stored in the disk group table DGTBL is an example of disk group state information for designating each of the disk devices A0 to A19 belonging to a plurality of the magnetic disk device groups Ga0 to Ga3 to be maintained in the spin-up state or to be maintained in the spin-down state. The spin-up state means a state where a disc is subject to spin-up, and thus each disk device A is mounted on the storage server SSVa. The spin-down state means a state where each disk device A is unmounted from the storage server SSVa and thus a disc is subject to spin-down. The disk device A in the spin-up state is an example of an active magnetic disk device that holds the motor to be in the rotating state. The disk device A in the spin-down state is an example of an inactive magnetic disk device in which the motor stops rotating. The information indicating the active order stored in the disk group table DGTBL is an example of order information for designating an order of setting the disk device A in the spin-down state to be in the spin-up state.

FIG. 7 illustrates an example of the data management table DMTBL illustrated in FIG. 1. FIG. 7 illustrates an example of the data management table DMTBL which the storage server SSVa has. Examples of the data management table DMTBL which the storage server SSVb, and SSVc have may be described by substituting the reference sign "B" or the reference sign "C" for the reference sign "A" in the area where the disk ID is stored in FIG. 7.

The data management table DMTBL includes an area in which information for indicating a data path, information for indicating the disk device A in which data is stored (storage disk ID), and information for indicating a size of the data are stored for each data item stored in the disk device A. For example, the data path means a path which the information processing system SYS1 uses in the hypertext transfer protocol (HTTP), and a path that is included in a method such as "PUT", and "DELETE" transmitted from the terminal device TM.

The storage server SSVa adds information of the stored data to the data management table DMTBL every time data is stored in any one of the disk devices A. The storage server SSVa deletes information of the deleted data from the data management table DMTBL every time data is deleted from any one of the disk devices A. The storage server SSVa recognizes the disk device A in which data is stored, and a size of the data with reference to the data management table DMTBL when the data is to be read from the disk device A.

The information stored in the data management table DMTBL is an example of data management information obtained by associating data identification information for identifying data and a size of the data for each data item stored in the plurality of the disk devices A0 to A19. The data path is an example of the data identification information.

FIG. 8 illustrates an example of the delete table DELTBL illustrated in FIG. 1. FIG. 8 illustrates an example of the delete table DELTBL which the storage server SSVa has. Examples of the delete table DELTBL which the storage server SSVb, and SSVc have may be described by substituting the reference sign "B" or the reference sign "C" for the reference sign "A" in FIG. 8.

The delete table DELTBL includes an area in which information for indicating a path of data that is requested to be deleted, and information for indicating a size of the data that is requested to be deleted are stored for each disk device A. The storage server SSVa stores the data that is requested to be deleted in the delete table DELTBL when the data that is requested to be deleted is held in a disk device A that is in the inactive state. Furthermore, when the data that is requested to be written is held in a disk device A that is in the inactive state (that is, when updating the data), the storage server SSVa stores information for indicating the data that is requested to be written in the delete table DELTBL.

The storage server SSVa stores the data in a disk device A that is in the active state when the data requested to be written is held in any one of the disk devices A that are in the inactive state. When the data requested to be deleted is stored in the disk device A that are in the active state, the storage server SSVa deletes the data from the disk device A. In this case, the content of the delete table DELTBL is not changed.

The storage server SSVa determines whether or not a summation value of sizes of data requested to be deleted and stored in the delete table DELTBL exceeds a predetermined amount (first threshold value illustrated in FIGS. 12 and 14) for each disk device A. The storage server SSVa deletes all the data items indicated by the information that is stored in the area corresponding to the disk device A in the delete table DELTBL when the summation value of the sizes of the data that are requested to be deleted exceeds the predetermined amount. The storage server SSVa deletes information of the deleted data from the delete table DELTBL.

The information stored in the delete table DELTBL is an example of deletion data management information including deletion data designation information for designating a data item to be deleted for each of the plurality of the disk devices, which is included in a request from the terminal device TM, and a size of the data to be deleted. Here, the request from the terminal device TM is assigned to the storage servers SSVa, SSVb, and SSVc through the front-end server FESV. A path of the data stored in the delete table DELTBL is an example of the deletion data designation information.

Figure 9:
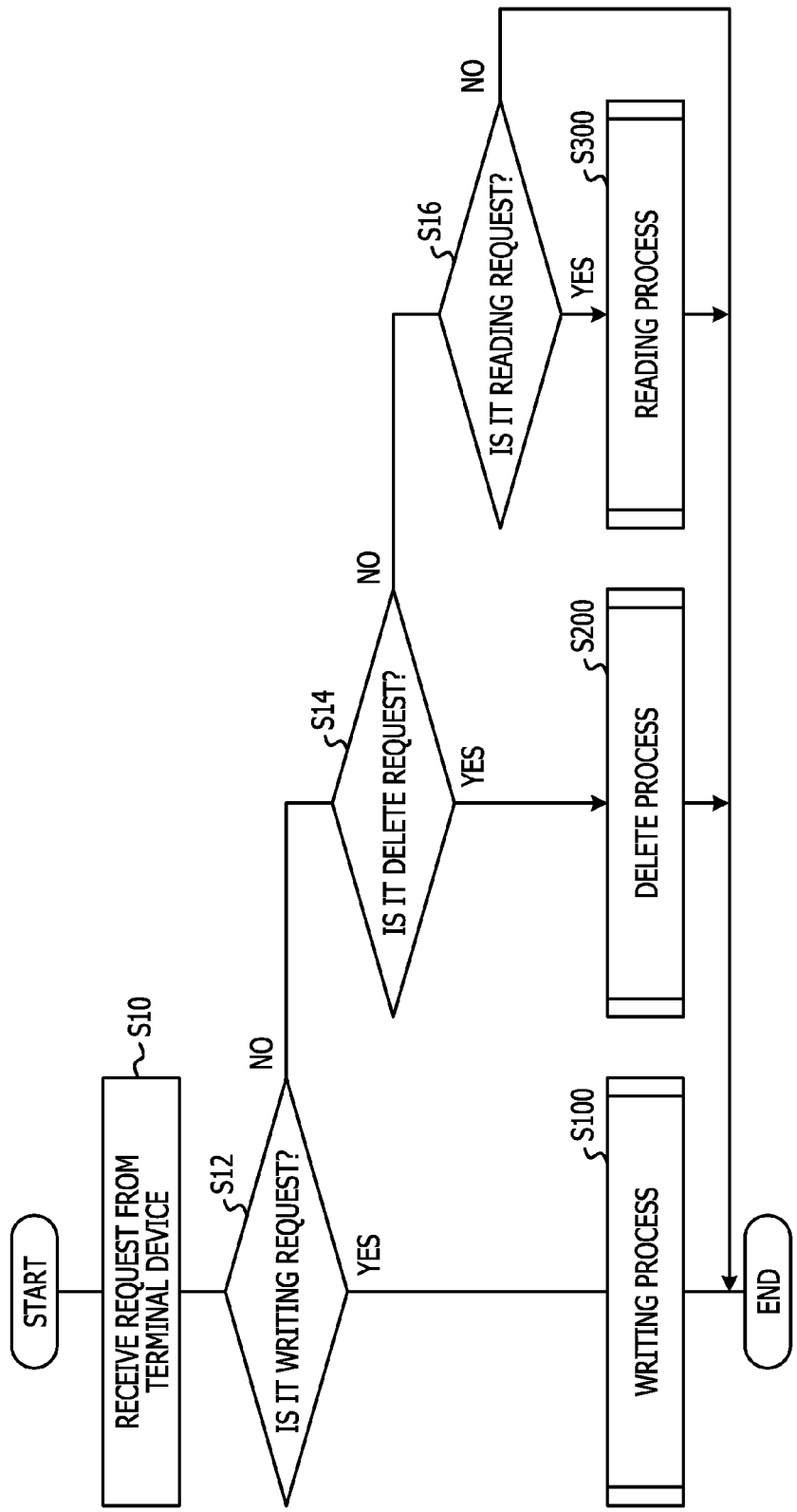
FIG. 9 is a diagram illustrating an example of an operation of a front-end server illustrated in FIG. 1.

FIG. 9 illustrates an example of an operation of the front-end server FESV illustrated in FIG. 1. The operation illustrated in FIG. 9 is realized by execution of the processor CPU0 of the front-end server FESV in the program PGM0. That is, FIG. 9 illustrates an example of a control method of the information processing system SYS1, and a control program of the front-end server FESV.

First, in step S10, the processor CPU0 receives a request from the terminal device TM. For example, the terminal device TM transmits the request to the front-end server FESV by using a PUT method, a DELETE method or a GET method. That is, the terminal device TM uses "PUT", "DELETE", or "GET" as a method in an application program interface (API) using HTTP. The terminal device TM designates a resource to store data by using a uniform resource identifier (URI). For example, when the IP address of the front-end server FESV is "192.168.1.100", the terminal device TM transmits "http://192.168.1.100/foo/bar/buz.jpg" using a PUT method. Here, "foo", "bar", and "buz" illustrate a meta-syntax variable, and "/foo/bar/buz.jpg" illustrates a path of the data. The transmitted data is stored at a body that is a type of tag in HTTP.

In step S12, the processor CPU0 proceeds to step S100 when the request indicates a writing request, and proceeds to step S14 when the request does not indicate the writing request. In step S14, the processor CPU0 proceeds to step S200 when the request indicates a delete request, and proceeds to step S16 when the request does not indicate the delete request. In step S16, the processor CPU0 proceeds to step S300 when the request indicates a reading request, and ends the process when the request does not indicate the reading request. The processor CPU0 may execute determinations of step S12, S14 and S16 in parallel.

Figure 10:
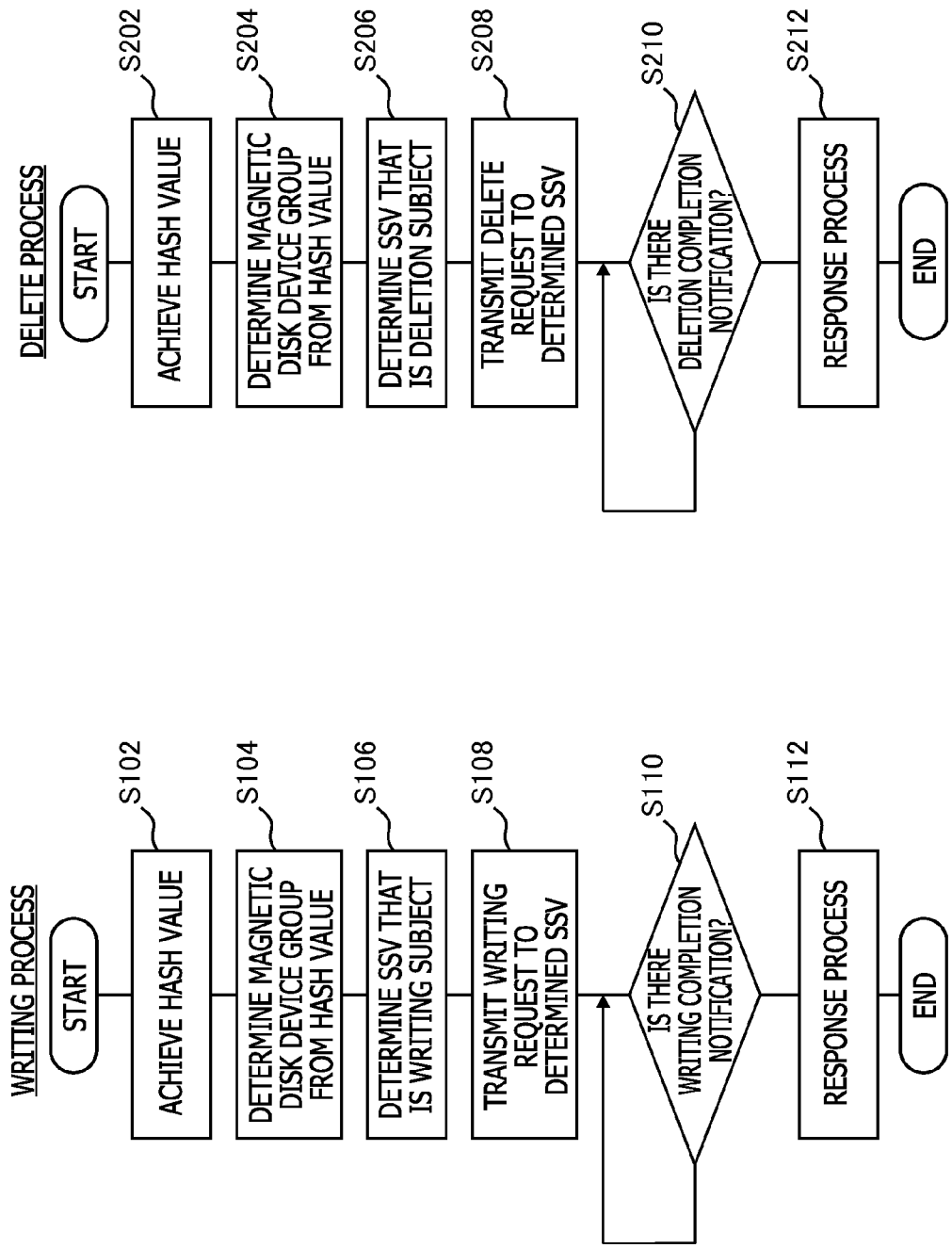
FIG. 10 is a diagram illustrating an example of a writing process and a delete process illustrated in FIG. 9.

In step S100, the processor CPU0 controls the storage servers SSVa, SSVb, and SSVc based on the writing request, and executes the writing process of storing the data in the disk devices A, B, and C. FIG. 10 illustrates an example of the writing process that the processor CPU0 executes.

In step S200, the processor CPU0 controls the storage servers SSVa, SSVb, and SSVc based on the delete request, and executes the delete process of deleting the data from the disk devices A, B, and C. FIG. 10 illustrates an example of the delete process that the processor CPU0 executes.

Figure 11:
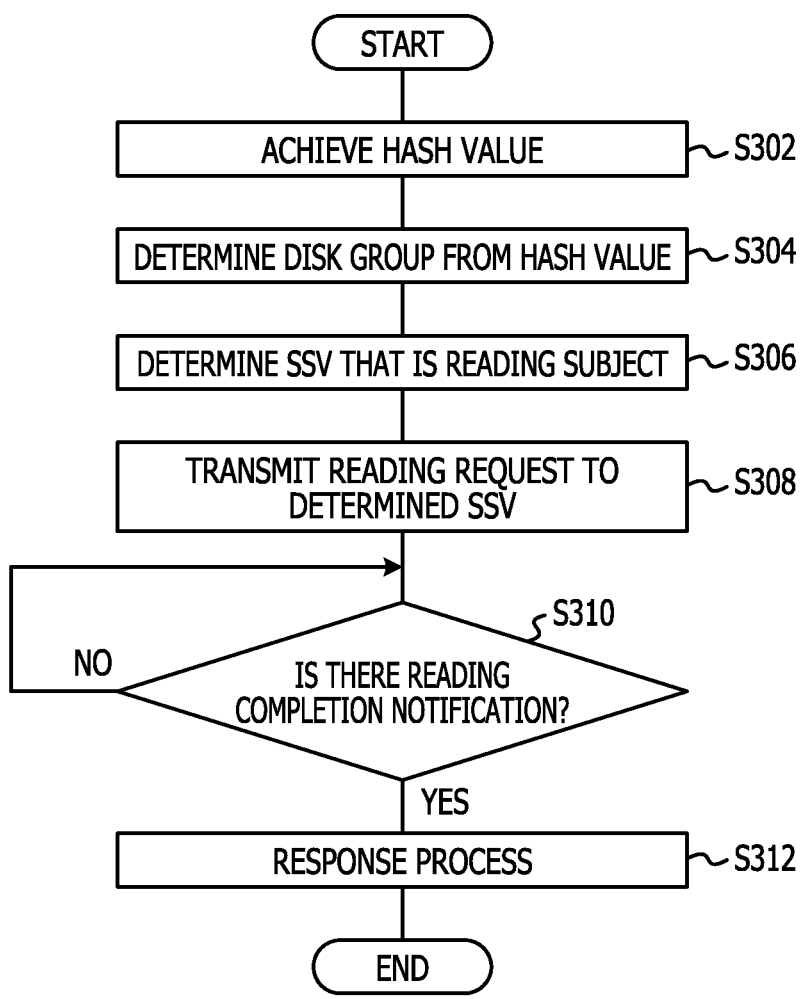
FIG. 11 is a diagram illustrating an example of a reading process illustrated in FIG. 9.

In step S300, the processor CPU0 controls the storage servers SSVa, SSVb, and SSVc based on the reading request, and executes the reading process of reading the data from the disk devices A, B, and C. FIG. 11 illustrates an example of the reading process that the processor CPU0 executes.

FIG. 10 is a diagram illustrating an example of the writing process and the delete process illustrated in FIG. 9.

The processor CPU0 receives a writing request from the terminal device TM, and in step S102, a path of data (for example, "/foo/bar/buz.jpg" in the URI) is input to the hash function, and then a hash value is obtained in the writing process. For example, the hash value is generated by using MD5 so as to have 128 bits.

In step S104, the processor CPU0 determines the magnetic disk device groups Ga, Gb, and Gc to store data with the obtained hash value by using the hash table HATBL illustrated in FIG. 2. In this embodiment, since three replica data are stored with redundancy in the three disk devices A, B, and C, the processor CPU0 determines the three magnetic disk device groups Ga, Gb, and Gc to store the data. The processor CPU0 determines one magnetic disk device group to store the data when one data is stored in one disk device, but is not stored in other disk devices. In this case, for example, the magnetic disk device groups Ga, Gb, and Gc are allocated to the hash spaces different from each other.

In step S106, the processor CPU0 searches for the server table SVTBL illustrated in FIG. 5, and achieves an IP address corresponding to the magnetic disk device groups Ga, Gb, and Gc determined in step S104. That is, the processor CPU0 determines the storage servers SSVa, SSVb, and SSVc being a writing subject that writes the data from the magnetic disk device groups Ga, Gb, and Gc. In this example, since the respective storage servers SSVa, SSVb, and SSVc store the data in the magnetic disk device groups Ga, Gb, and Gc, all the storage servers SSVa, SSVb, and SSVc are determined to be a writing subject.

Figure 12:
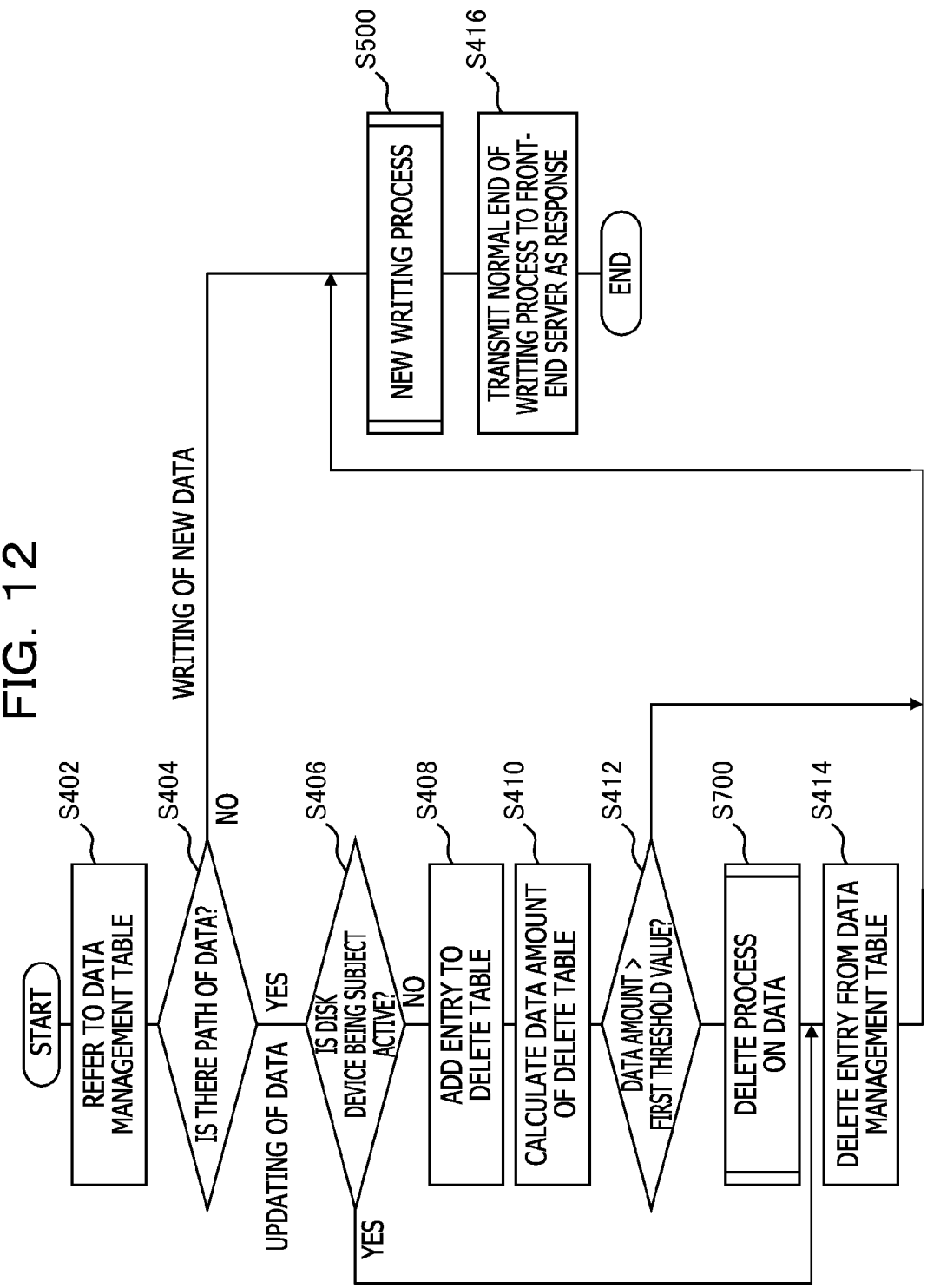
FIG. 12 is a diagram illustrating an example of the writing process which a storage server receiving a writing request executes in FIG. 10.

In step 108, the processor CPU0 respectively transmits the writing request to the storage servers SSVa, SSVb, and SSVc determined to be a writing subject. For example, the writing request includes data to be written, information for indicating the magnetic disk device groups Ga, Gb, and Gc that store the data to be written, and the full bits hash value. FIG. 12 illustrates an example of the operation of the respective storage servers SSVa, SSVb, and SSVc that receive the writing request.

In step S110, the processor CPU0 waits to receive a writing completion notification indicating completion of data writing from the storage servers SSVa, SSVb, and SSVc. In step S112, the processor CPU0 notifies the terminal device TM of the completion of writing of the data, and ends the writing process of the data when the writing completion notifications are received from all the storage servers SSVa, SSVb, and SSVc. That is, the processor CPU0 executes a response process in response to the writing completion notification.

Meanwhile, the processor CPU0 receives a delete request from the terminal device TM, and in step S202, a path of data is input to the hash function, and then a hash value is obtained in the delete process. In step S204, the processor CPU0 determines the magnetic disk device groups Ga, Gb, and Gc to delete data with the obtained hash value by using the hash table HATBL illustrated in FIG. 2. The processor CPU0 determines one magnetic disk device group that stores the data when one data item is stored in one disk device, but is not stored in other disk devices, as in the writing process.

In step S206, the processor CPU0 searches for the server table SVTBL illustrated in FIG. 5, and achieves an IP address corresponding to the magnetic disk device groups Ga, Gb, and Gc determined in step S204. That is, the processor CPU0 determines the storage servers SSVa, SSVb, and SSVc being a deletion subject that deletes the data from the magnetic disk device groups Ga, Gb, and Gc.

Figure 14:
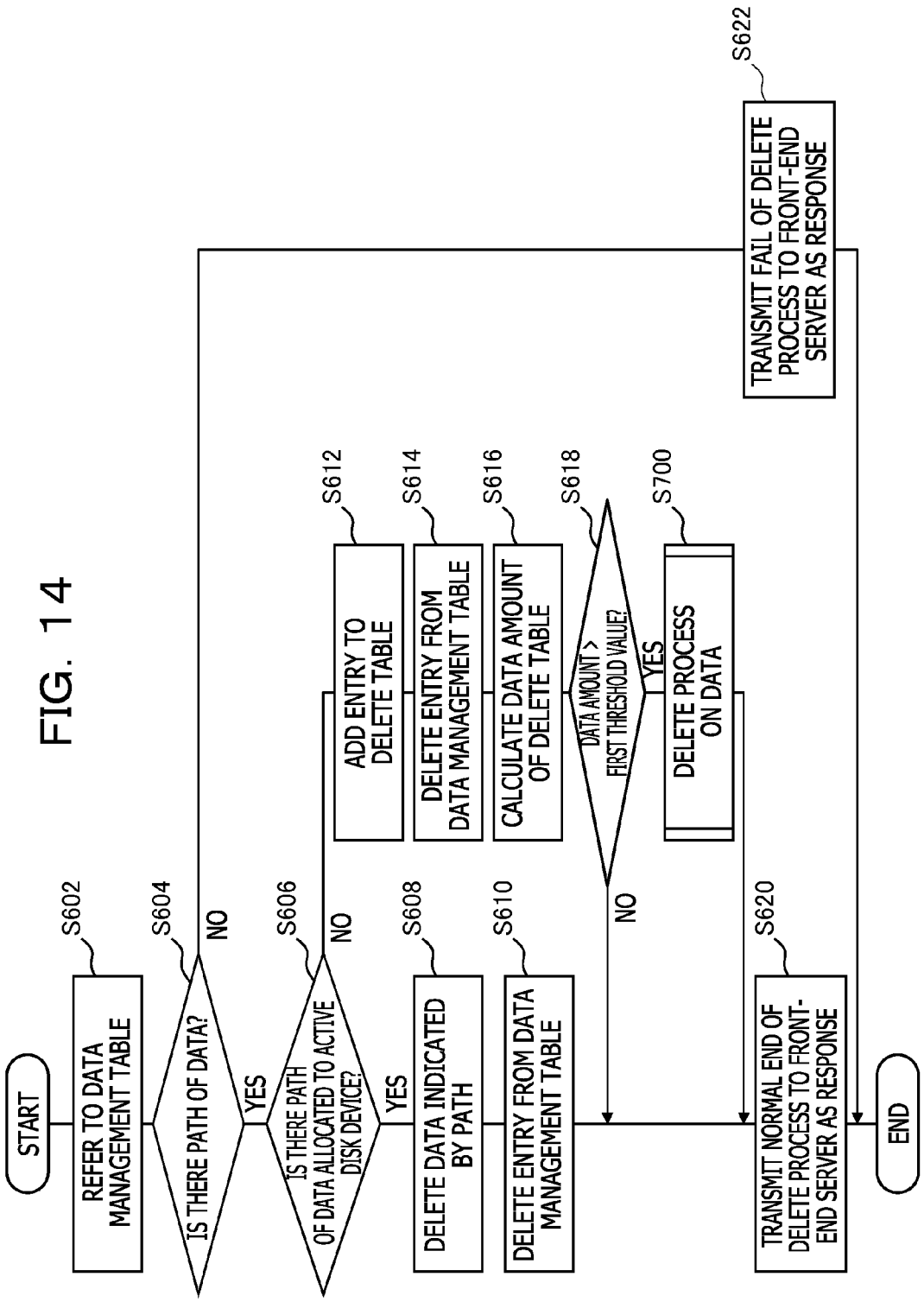
FIG. 14 is a diagram illustrating an example of the delete process which a storage server receiving a delete request executes in FIG. 10.

In step 208, the processor CPU0 respectively transmits the delete request to the storage servers SSVa, SSVb, and SSVc determined to be a deletion subject. For example, the delete request includes information for indicating the magnetic disk device groups Ga, Gb, and Gc that delete the data, and the full bits hash value. FIG. 14 illustrates an example of the operation of the respective storage servers SSVa, SSVb, and SSVc that receive the delete request.

In step S210, the processor CPU0 waits to receive a deletion completion notification indicating completion of data deletion from the storage servers SSVa, SSVb, and SSVc. In step S212, the processor CPU0 notifies the terminal device TM of the completion of deletion of the data, and ends the delete process of the data when the deletion completion notifications are received from all the storage servers SSVa, SSVb, and SSVc. That is, the processor CPU0 executes a response process in response to the deletion completion notification. The delete process may be performed when the data is actually deleted from the disk device, and the data is considered as being deleted from the disk device by using the delete table DELTBL and the data management table DMTBL, as described in FIG. 14.

FIG. 11 illustrates an example of the reading process illustrated in FIG. 9.

The processor CPU0 receives a reading request from the terminal device TM, and in step S302, a path of a data is input to the hash function, and then a hash value is obtained in the reading process.

In step S304, the processor CPU0 determines one of the magnetic disk device groups Ga, Gb, and Gc to read data with the obtained hash value by using the hash table HATBL illustrated in FIG. 2. The processor CPU0 may determine the three magnetic disk device groups Ga, Gb, and Gc to read the data with the obtained hash value, as in the writing process. In this case, the processor CPU0 determines a proper data of three data items that are read from the three magnetic disk device groups Ga, Gb, and Gc. The processor CPU0 determines one magnetic disk device group to read the data when one data item is stored in one disk device.

In step S306, the processor CPU0 searches for the server table SVTBL illustrated in FIG. 5, and achieves an IP address corresponding to one of the magnetic disk device groups Ga, Gb, and Gc determined in step S304. That is, the processor CPU0 determines one of the storage servers SSVa, SSVb, and SSVc being a reading subject that reads the data from one of the magnetic disk device groups Ga, Gb, and Gc.

Figure 18:
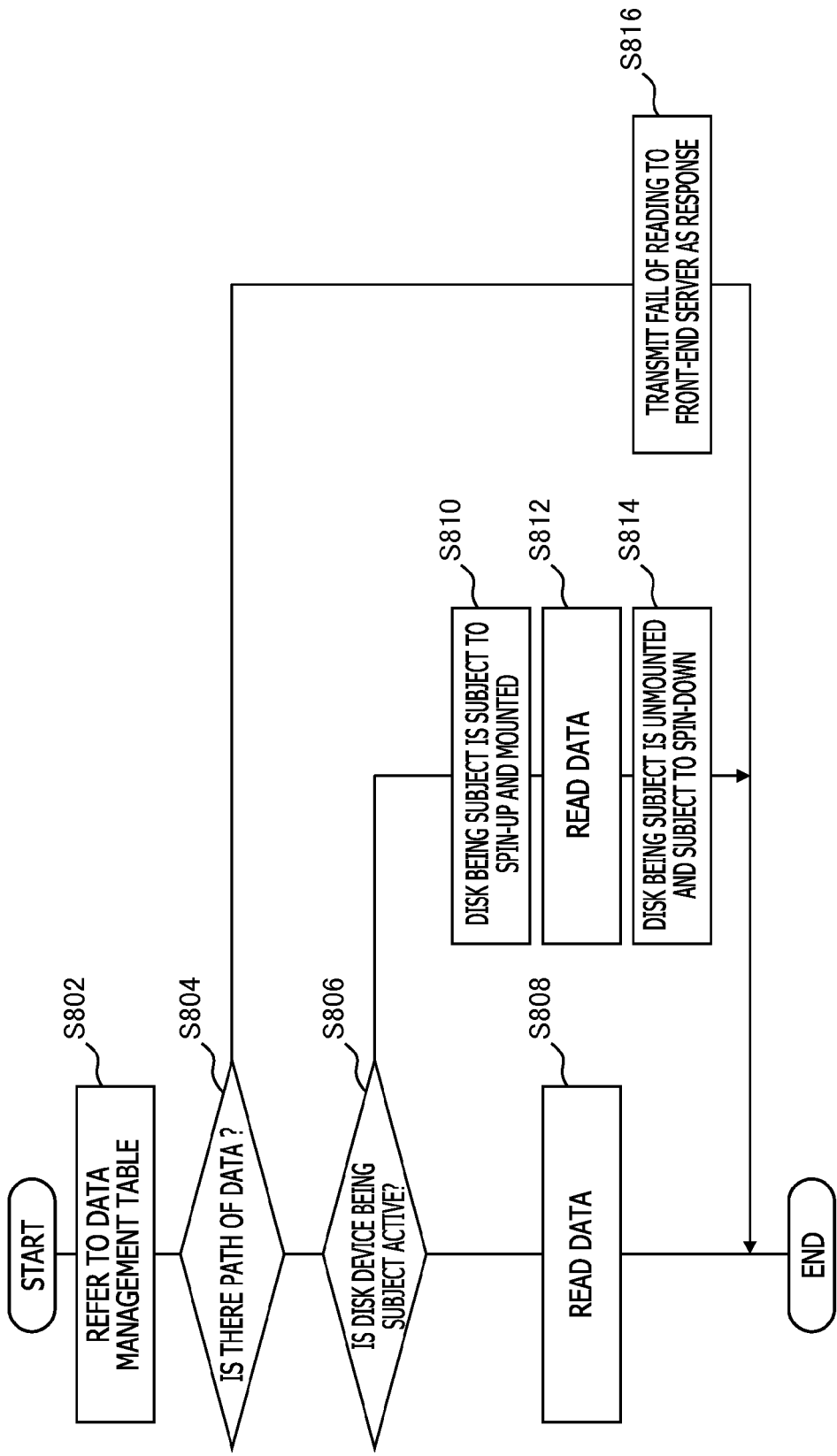
FIG. 18 is a diagram illustrating an example of the reading process which a storage server receiving a reading request executes in FIG. 11.

In step 308, the processor CPU0 respectively transmits the reading request to one of the storage servers SSVa, SSVb, and SSVc determined to be a reading subject. For example, the reading request includes information of the magnetic disk device group Ga (or, Gb or Gc) that reads the data out, and the full bits hash value. FIG. 18 illustrates an example of the operation of the storage servers SSV that receives the reading request.

In step S310, the processor CPU0 waits to receive a reading completion notification indicating completion of data reading from any one of the storage servers SSVa, SSVb, and SSVc. The reading completion notification includes the read data from the disk device. In step S312, the processor CPU0 transmits the read data to the terminal device TM, and ends the reading process of the data when the reading completion notification is received from any one of the storage servers SSVa, SSVb, and SSVc. That is, the processor CPU0 executes a response process in response to the reading completion notification.

FIG. 12 illustrates an example of the writing process which is executed by the storage server SSV that receives the writing request in FIG. 10. The process illustrated in FIG. 12 is realized by execution of the respective processors CPU1 of the storage servers SSV that receive the writing request on the program PGM1. That is, FIG. 12 illustrates an example of the control method of the information processing system SYS1, and the control program of the storage servers SSV.

In step 402, the processor CPU1 refers to the data management table DMTBL illustrated in FIG. 7. In step 402, the processor CPU1 reads an entry including a path of data included in the writing request, for example, in the data management table DMTBL when the path of the data included in the writing request is present in the data management table DMTBL. The entry including the path of the data included in the writing request includes information of the disk device where the data is stored (storage disk ID).

In step S404, the processor CPU1 determines whether or not the path of the data included in the writing request is present in the data management table DMTBL. The process proceeds to step S406 in order to update the data when the path of the data is present. The process proceeds to step S500 in order to write new data when the path of the data is not present.

In step S406, the processor CPU1 refers to the disk group table DGTBL, and determines whether or not a subject disk device is in the active state, which is a disk device that stores the data. The process proceeds to step S414 since the data may be directly written in the disk device, when the disk device is in the active state. The process proceeds to step S408 in order to update the data when the disk device is in the inactive state.

In step S408, the processor CPU1 adds the entry (the path of the data, and a size of the data) to the delete table DELTBL (FIG. 8) corresponding to the disk device included in the entry, the entry including the path of the data included in the writing request. That is, the processor CPU1 stores a new entry including a path of the data and a size of the data in the delete table DELTBL when the data is updated.

In step S410, the processor CPU1 achieves a summation of data size that is a summation of all the data sizes stored in the area of the delete table DELTBL adding the entry, the area where the data size is stored. That is, the processor CPU1 calculates a data amount of the data that is registered in the delete table DELTBL to be deleted.

In step S412, the processor CPU1 determines whether or not the calculated data amount exceeds a first threshold value. The process proceeds to step S700 in order to delete the data stored in the disk device corresponding to the delete table DELTBL where the data amount is calculated when the calculated data amount exceeds the first threshold value. For example, the first threshold value is approximately 10% to 30% of the storage capacity of the disk device. In step S700, the processor CPU1 executes the delete process on the data.

Figure 15:
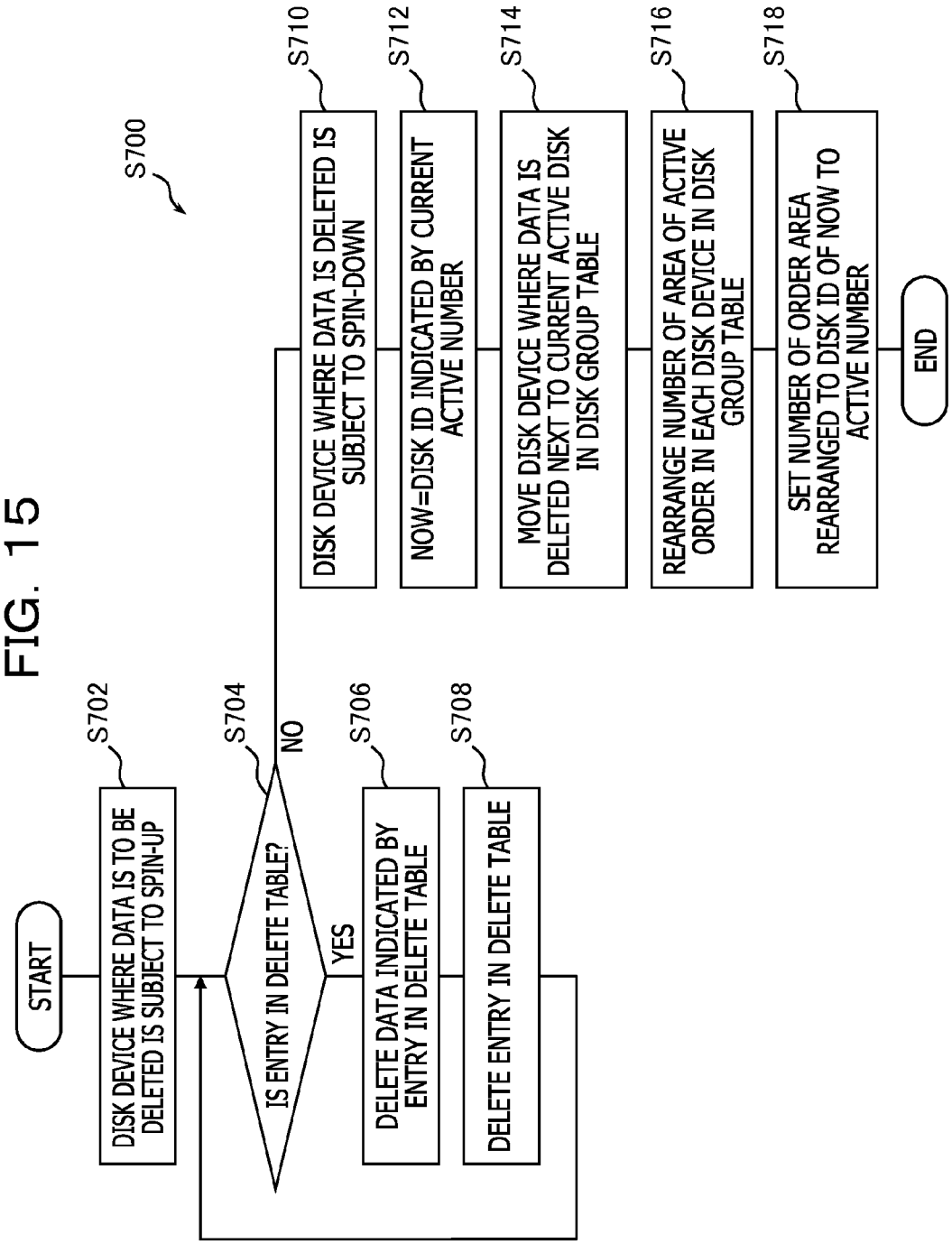
FIG. 15 is a diagram illustrating an example of the delete process of a file illustrated in FIGS. 12 and 14.
Figure 17:
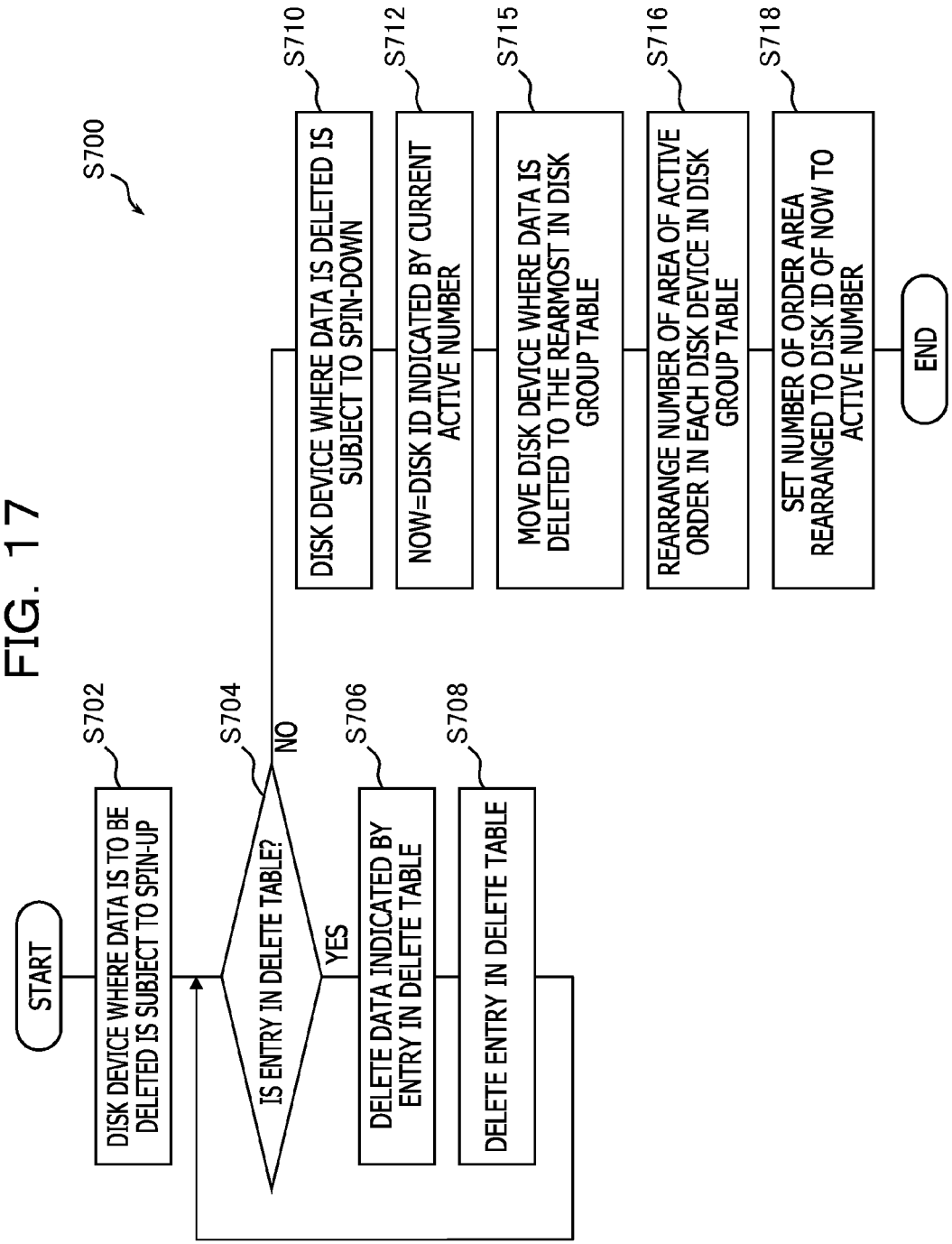
FIG. 17 is a diagram illustrating another example of the delete process of a file illustrated in FIGS. 12 and 14.

FIGS. 15 and 17 illustrate an example of the delete process on the data. The process proceeds to step S414 after the process of step S700.

The updating based on a writing request of data stored in the disk device being in the inactive state includes deleting of the data stored in the disk device being in the inactive state, and writing of data in the disk device being in the active state. In this embodiment, the processor CPU1 does not execute the delete process on the data included in the updating process on the data for each writing request. Accordingly, the disk device being in the inactive state is set to be in the active state, the frequency of setting the disk device to be in the inactive state again subsequent to deletion of the data is small compared to when data is deleted for each updating process. The frequency of spin-up and spin-down in the disk device may decrease, and thus degradation of the disk device may be suppressed.

The frequency of spin-up and spin-down in the disk device decreases, and thus power consumption may be greatly reduced in the disk pool DP compared to when data is deleted for each updating process. Furthermore, the frequency of causing the storage server SSV to access the disk device may be reduced by collecting and deleting data, and degradation of the storage server SSV in performance may be suppressed due to frequent occurrence of accesses of the disk device.

In step S414, the processor CPU1 deletes the entry corresponding to the deleted data from the data management table DMTBL. For example, a size of the updated data may be different from a size of the original data stored in the disk device. Accordingly, the processor CPU1 deletes information of the original data stored in the disk device (entry), and adds information of the data to be updated (entry) to the data management table DMTBL when the data to be updated is stored in the disk device. Thus, information of the updated data may be reflected in the data management table DMTBL when data indicated by an entry that is registered in the data management table DMTBL is updated (rewritten).

In step S500, the processor CPU1 executes a writing process on new data. In step S500, the writing is executed on the updated data corresponding to an entry registered in the data management table DMTBL in addition to data corresponding to an entry that is not registered in the data management table DMTBL. The original data is considered as being deleted in step S408 or the original data is deleted in step S700 when the updated original data is stored in the disk device being in the inactive state. Data stored in the disk device being in the active state is updated by overlapping the data.

In this embodiment, data subsequent to updating is present in the disk device being in the active state when the data is updated. There are many cases where the frequency of the updated data that is accessed again exceeds the frequency of data that is not being updated is accessed again. The disk device is not subject to spin-up when the original data stored in the disk device being in the inactive state is moved to the disk device being in the active state in the updating process on the data, and writing, deleting, and reading may be executed that occur next time. In other words, the frequency of spin-up and spin-down in the disk device decreases, and thus degradation of the disk device may be suppressed, and power consumption may be greatly reduced in the disk pool DP.

Figure 13:
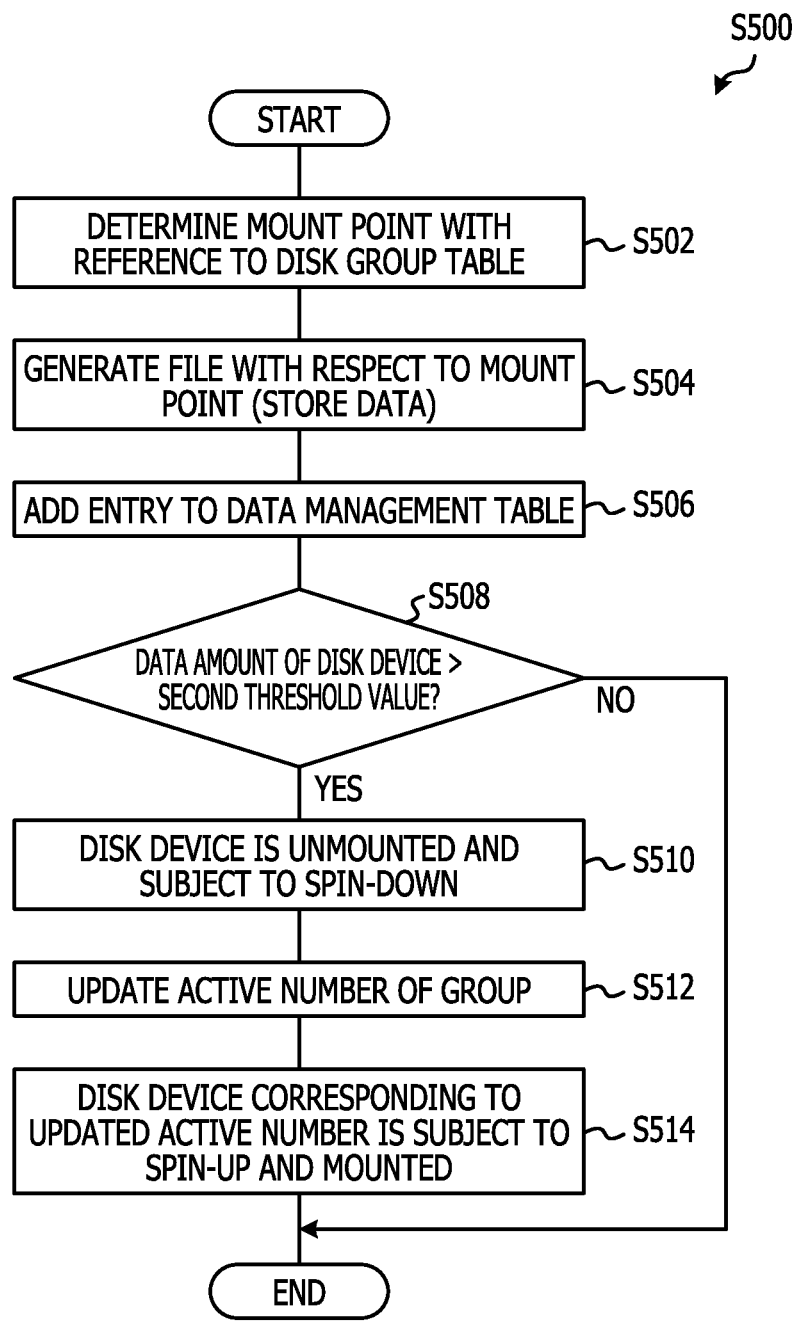
FIG. 13 is a diagram illustrating an example of a new writing process illustrated in FIG. 12.

FIG. 13 illustrates an example of a new writing process on data. The process proceeds to step S416 subsequent to the process of step S500.

In step S416, the processor CPU1 transmits a response to a writing completion notification indicating that the writing process is normally ended to the front-end server FESV. Consequently, the writing process is ended.

FIG. 13 illustrates an example of the new writing process illustrated in FIG. 12. The process illustrated in FIG. 13 is respectively executed by the processors CPU1 of the storage server SSV that receive a writing request. The writing of data is executed in the disk device being in the active state (for example, the state ST1 in FIG. 4), and accordingly a process of spin-up and spin-down may be omitted.

In step S502, the processor CPU1 determines the mount point of the disk device that stores data with reference to the disk group table DGTBL (FIG. 6). FIG. 6 illustrates the disk group table DGTBL which the storage server SSVa has, but the storage servers SSVb, and SSVc respectively refer to the disk group table DGTBL which the storage servers SSVb and SSVc have.

In step S504, the processor CPU1 makes a file including data corresponding to the determined mount point, and stores the data in the disk device mounted on the mount point. In step S506, the processor CPU1 adds information of the stored data (entry) to the data management table DMTBL (FIG. 7).

In step S508, the processor CPU1 determines whether or not a data amount of data stored in the disk device that stores data exceeds a second threshold value. Determination of the disk device determined to be full storing data is performed when the data amount exceeds the second threshold value, and the process proceeds to step S510. For example, the second threshold value is approximately 80% to 90% of the storage capacity of the disk device.

In step S510, the processor CPU1 causes the disk device determined to be full to be unmounted, and to be subject to spin-down. That is, the disk device determined to be full is changed from the spin-up state to the spin-down state. The full disk device is set to be in the spin-down state, and thus the power consumption of the processing system SYS1 may be greatly reduced compared to when the spin-up state is held.

In step S512, the processor CPU1 updates the active number according to a numerical value stored in an area of the active order of the magnetic disk device group Ga to which the disk device subject to the spin-down belongs in the disk group table DGTBL (FIG. 6). For example, the active number is changed from "1" to "2" in FIG. 6, and the magnetic disk device group Ga to which the disk device subject to the spin-down belongs is changed from the state ST1 to the state ST2 in the hash ring illustrated in FIG. 4.

In step S514, the processor CPU1 causes the disk device to be subject to spin-up, the disk device indicated by the active number of the updated disk group table DGTBL, and causes the disk device to be mounted on the mount point stored in the disk group table DGTBL. That is, a new disk device is set from being in the spin-down state to be in the spin-up state. Then, the processor CPU1 stores data in the disk device reset to be in the spin-up state.

FIG. 14 illustrates an example of the delete process that is executed by the storage server SSV receiving a delete request in FIG. 10. The process illustrated in FIG. 14 is realized by execution of the respective processors CPU1 of the storage server SW that receives a delete request on the program PGM1. That is, FIG. 14 illustrates an example of the control method of the information processing system SYS1, and the control program of the storage server SSV.

In step 602, the processor CPU1 refers to the data management table DMTBL illustrated in FIG. 7. In step 602, the processor CPU1 reads out an entry including a path of data included in the delete request, for example, in the data management table DMTBL when the path of the data included in the delete request is present in the data management table DMTBL. The entry including the path of the data included in the delete request includes information of the disk device where the data is stored (storage disk ID).

In step S604, the processor CPU1 determines whether or not the path of the data included in the delete request is present in the data management table DMTBL. The process proceeds to step S606 in order to delete the data when the path of the data is present. The process proceeds to step S622 such that the data to be deleted is not stored in the disk device when the path of the data is not present.

In step S606, the processor CPU1 determines whether or not a subject disk device is in the active state, which is a disk device that stores the data to be deleted, with reference to the disk group table DGTBL. The process proceeds to step S608 since the data may be directly deleted in the disk device, when the disk device is in the active state. The process proceeds to step S612 in order to execute a process of considering the data as being deleted from the disk device when the disk device is in the inactive state.

In step S608, the processor CPU1 searches for the disk device where the data to be deleted is stored, with reference to the data management table DMTBL, and deletes the data from the searched disk device. In step 610, the processor CPU1 deletes the entry of the deleted data from the data management table DMTBL. The process proceeds to step S620 subsequent to the process of step S610. As in steps S608 and S610, the processor CPU1 does not add information of the data to the delete table DELTBL but deletes the data when the disk device is in the active state, in which the data to be deleted is stored. Accordingly, the information added to the delete table DELTBL may be limited to information of a data to be deleted from the disk device in the inactive state, and efficiency degradation may be suppressed in the delete process of a data executed in step S700.

Meanwhile, in step S612, the processor CPU1 adds the entry (the path of the data, and a size of the data) to the delete table DELTBL corresponding to the disk device included in the entry, the entry including the path of the data included in the delete request. That is, the processor CPU1 stores a new entry including the path of the data and the size of the data in the delete table DELTBL.

In step S614, the processor CPU1 deletes the entry of the data to be deleted from the data management table DMTBL based on the path of the data achieved in the determination of step S604.

In step S616, the processor CPU1 achieves a summation of data size that is a summation of all the data sizes stored in the area of the delete table DELTBL adding the entry, the area where the data size is stored. That is, the processor CPU1 calculates a data amount of the data to be deleted that is registered in the delete table DELTBL.

In step S618, the processor CPU1 determines whether or not the calculated data amount exceeds the first threshold value. The process proceeds to step S700 in order to delete the data stored in the disk device corresponding to the delete table DELTBL where the data amount is calculated when the calculated data amount exceeds the first threshold value. The process proceeds to step S620 when the calculated data amount is equal to or less than the first threshold value. FIGS. 15 and 17 illustrate examples of the delete process on data executed in step S700. The process proceeds to step S620 subsequent to the process of step S700.

The processor CPU1 does not execute the delete process on data for each delete request when the delete request of the data stored in the disk device being in the inactive state is received. The processor CPU1 collects and deletes data corresponding to entries accumulated in the delete table DELTBL based on that the entries of the data to be deleted are accumulated with a predetermined amount in the delete table DELTBL. Accordingly, efficiency in deletion of data may be improved compared to when data is deleted for each delete request.

The frequency may decrease compared to when data is deleted for each delete request, the frequency that the disk device in the inactive state is set to be in the inactive state, and after deleting of the data, the disk device is set to be back in the active state. Since the frequency of the disk device being subject to spin-up and spin-down may decrease, degradation of the disk device may be suppressed. The frequency of the disk device being subject to spin-up and spin-down decreases, and thus power consumption in the disk pool DP may be greatly reduced compared to when data is deleted for each updating process.

In step S620, the processor CPU1 transmits a deletion completion notification indicating that the delete process is normally ended to the front-end server FESV as a response. Consequently, the delete process is ended. In step S622, the processor CPU1 transmits a deletion fail notification indicating that the delete process has failed to the front-end server FESV as a response when data to be deleted is not stored in the disk device. Consequently, the delete process is ended.

FIG. 15 illustrates an example of the delete process on a file illustrated in FIGS. 12 and 14. The respective storage servers SSV execute a delete process illustrated in FIG. 15 when receiving the delete request.

In step S702, the processor CPU1 changes the disk device that deletes data to be in the spin-up state from being in the spin-down state. In step S704, the processor CPU1 determines whether or not an entry is in the delete table DELTBL corresponding to the disk device subject to spin-up. The process proceeds to step S706 in order to delete the data when the entry is in the delete table DELTBL. The process proceeds to step S710 in order to delete all data items from the disk device when no entry is in the delete table DELTBL.

In step S706, the processor CPU1 deletes data from the disk device, the data included in the entry that is stored in the delete table DELTBL corresponding to the disk device subject to spin-up. In step S708, the processor CPU1 deletes the entry of the deleted data from the delete table DELTBL. The processes of step S706 and step S708 are repeatedly executed until no entry is in the delete table DELTBL corresponding to the disk device subject to spin-up.

In step S710, the processor CPU1 changes the disk device that deletes data to be in the spin-down state from being in the spin-up state. The delete process on data illustrated in FIG. 15 is executed when a summation of data exceeds the first threshold value, the data included in an entry that is registered in the delete table DELTBL. Accordingly, effective data not to be deleted remain in the disk device in which data is deleted by executing the processes from step S704 to step S708. For example, effective data occupied by 60% of the storage capacity is held in the disk device in which data is deleted by executing the processes from step S704 to step S708 when the first threshold value is set to 20%, and the second threshold value is set to 80%.

The data management table DMTBL does not delete but holds an entry corresponding to the effective data held in the disk device in which the delete process is executed. Thus, data of which an amount is equal to or less than the second threshold value illustrated in FIG. 13 are stored in the disk device that is set to be in the spin-down state subsequent to the delete process, and thus new data may be written.

In steps S712, S714, S716, and S718, a process is executed in which the disk device where data is deleted is allocated as a disk device that allows data to be written.

In step S712, the processor CPU1 sets information indicating the disk device, indicated by the active number (for example, a value of the active number), to be a variable NOW with reference to the disk group table DGTBL.

In step S714, the processor CPU1 executes a process of changing an entry of the magnetic disk device group including the disk device where data is deleted, in the disk group table DGTBL. For example, the processor CPU1 moves an entry of the disk device where the data is deleted next to an entry of the disk device currently in the active state.

In step S716, the processor CPU1 rearranges numbers stored in the area of the active order in the ascending order in the disk group table DGTBL. In step S718, the processor CPU1 sets to a new active number the number that is stored in the area of the active order and rearranged in order to correspond to the disk ID (disk group table DGTBL) indicating the disk device indicated by the variable NOW. With this, the disk device in the active state maintains the active state, and the disk device where the data is deleted is registered in the disk group table DGTBL as a disk device to be set to be in the active state next time. The disk device where there is a vacant area due to the delete process on data may be set to be in the active state, and thus the disk device may be effectively used, compared to when not using a storage area where data is deleted. Accordingly, a utilization ratio of the disk pool DP may be improved.

FIG. 16 illustrates an example of the change of information stored in the disk group table DGTBL in the delete process on data by FIG. 15. The delete process on data illustrated in FIG. 15 is assumed to be executed in the disk device A0 of the magnetic disk device group Ga0 in FIG. 16. A state of the disk group table DGTBL subsequent to execution of the process of step S712 in FIG. 15 is the same as (A) in FIG. 6. The variable NOW is set to A4 indicating the disk device A4 in step S712.

An entry of the disk device A0 where data is deleted is moved next to an entry of the disk device A4 currently in the active state in step S714 of FIG. 15 ((B) in FIG. 16). The numbers stored in the area of the active order are rearranged in the ascending order, a value of the active order corresponding to the entry of the disk device A4 is set to "0", and a value of the active order corresponding to the entry of the disk device A0 is set to "1" in step S716 of FIG. 15 ((C) in FIG. 16). The number "0" stored in the area of the active order is set to a new active number in the entry of the disk device A4 indicated by the variable NOW, in step S718 of FIG. 15 ((D) in FIG. 16).

Then, the disk device A4 is set to be in the inactive state when a data amount of data stored in the disk device A4 exceeds the second threshold value due to storing the data. The disk device A0 is set to be in the active state, which is set to the next order in the active order in the disk group table DGTBL.

FIG. 17 illustrates another example of the delete process on a file illustrated in FIGS. 12 and 14. Detailed description of the process that is the same as or similar to FIG. 15 will be omitted. The process of step S715 is executed instead of the process of step S714 in FIG. 15 in the delete process on data illustrated in FIG. 17. Other processes are the same as or similar to FIG. 15.

In step S715, the processor CPU1 moves an entry of the disk device where data is deleted to the rearmost of the disk group table DGTBL.

FIG. 18 illustrates an example of the reading process which the storage server SSV receiving a reading request executes in FIG. 11. The process illustrated in FIG. 18 is realized by execution of the respective processors CPU1 of the storage servers SSV that receive the reading request, on the program PGM1. FIG. 18 illustrates an example of the control method of the information processing system SYS1, and the control program of the storage server SSV.

In step S802, the processor CPU1 refers to the data management table DMTBL illustrated in FIG. 7. In step S802, the processor CPU1 reads out an entry including a path of data included in the reading request, for example, in the data management table DMTBL when the path of the data included in the reading request is in the data management table DMTBL. The entry including the path of the data included in the reading request includes information of the disk device where the data is stored (storage disk ID).

In step S804, the processor CPU1 determines whether or not the path of the data included in the reading request is present in the data management table DMTBL. The process proceeds to step S806 in order to read out the data when the path of the data is present. The process proceeds to step S816 in order not to store the data to be read in the disk device when the path of the data is not present.

In step S806, the processor CPU1 determines whether or not a subject disk device is in the active state, which is a disk device where the data to be read is stored, with reference to the disk group table DGTBL. The process proceeds to step S808 since the data may be directly read in the disk device, when the disk device is in the active state. The process proceeds to step S810 in order to set the disk device to be in the active state, when the disk device is in the inactive state.

In step S808, the processor CPU1 searches for the disk device that stores the data to be read with reference to the data management table DMTBL, reads out the data from the searched disk device, and transmits the read data to the front-end server FESV. Consequently, the reading process is ended.

In step S810, the processor CPU1 causes a subject disk to be subject to spin-up, the subject disk that is a disk device where the data to be read is stored, and causes the disk device to be mounted on the mount point stored in the disk group table DGTBL. In step S812, the processor CPU1 searches for the disk device that stores the data to be read with reference to the data management table DMTBL. The processor CPU1 reads out the data from the searched disk device, and transmits the read data to the front-end server FESV.

In step S814, the processor CPU1 causes the disk device reading the data to be unmounted, and to be subject to spin-down. The processor CPU1 may maintain the disk device reading the data to be in the spin-up state when the reading is expected to continuously be requested to the disk device reading the data. Consequently, the reading process is ended.

In step S816, the processor CPU1 transmits a reading fail notification indicating that the reading process has failed to the front-end server FESV as a response when a data to be read is not stored in the disk device. Consequently, the reading process is ended.

Figure 19:
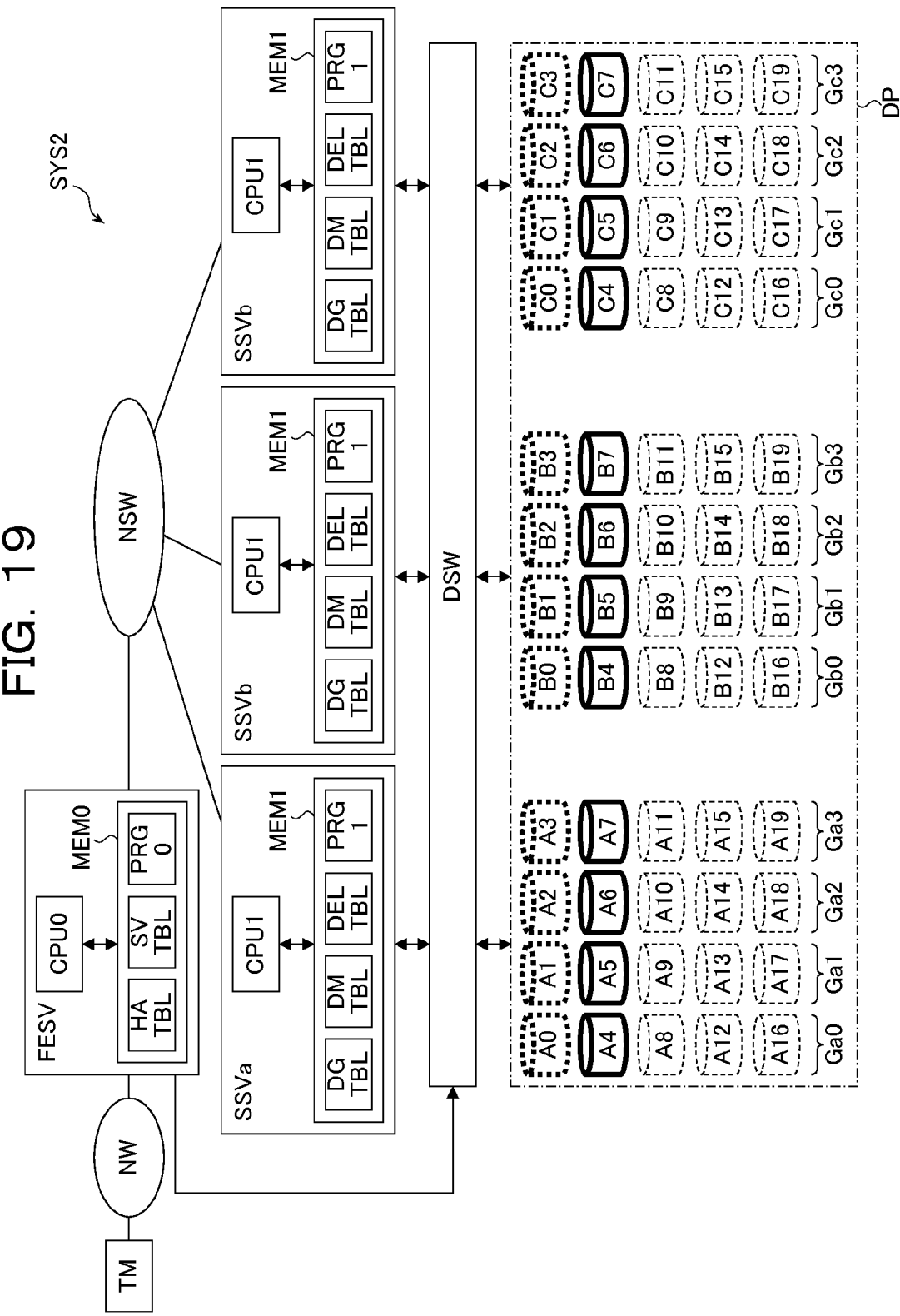
FIG. 19 is a diagram illustrating another example of the information processing system.

FIG. 19 illustrates another example of the information processing system. Components same as or similar to components described in FIGS. 1 to 8 are denoted by the same reference numerals, and detailed description thereof will be omitted.

The information processing system SYS2 illustrated in FIG. 19 includes a switch DSW that couples the storage servers SSV (SSVa, SSVb, and SSVc) and the disk pool DP. The switch DSW operates based on coupling information that the front-end server FESV manages. The switch DSW couples the storage server SSVa and the magnetic disk device group Ga, couples the storage server SSVb and the magnetic disk device group Gb, and couples the storage server SSVc and the magnetic disk device group Gc.

Other configurations of the information processing system SYS2 are similar to the information processing system SYS1 illustrated in FIG. 1 except that the disk pool DP is provided with the magnetic disk device groups Ga, Gb, and Gc, in common. The information processing system SYS2 illustrated in FIG. 19 operates similarly to FIGS. 9 to 18. The disk pool DP may be provided for each of the magnetic disk device groups Ga, Gb, and Gc, as in FIG. 1.

Figure 20:
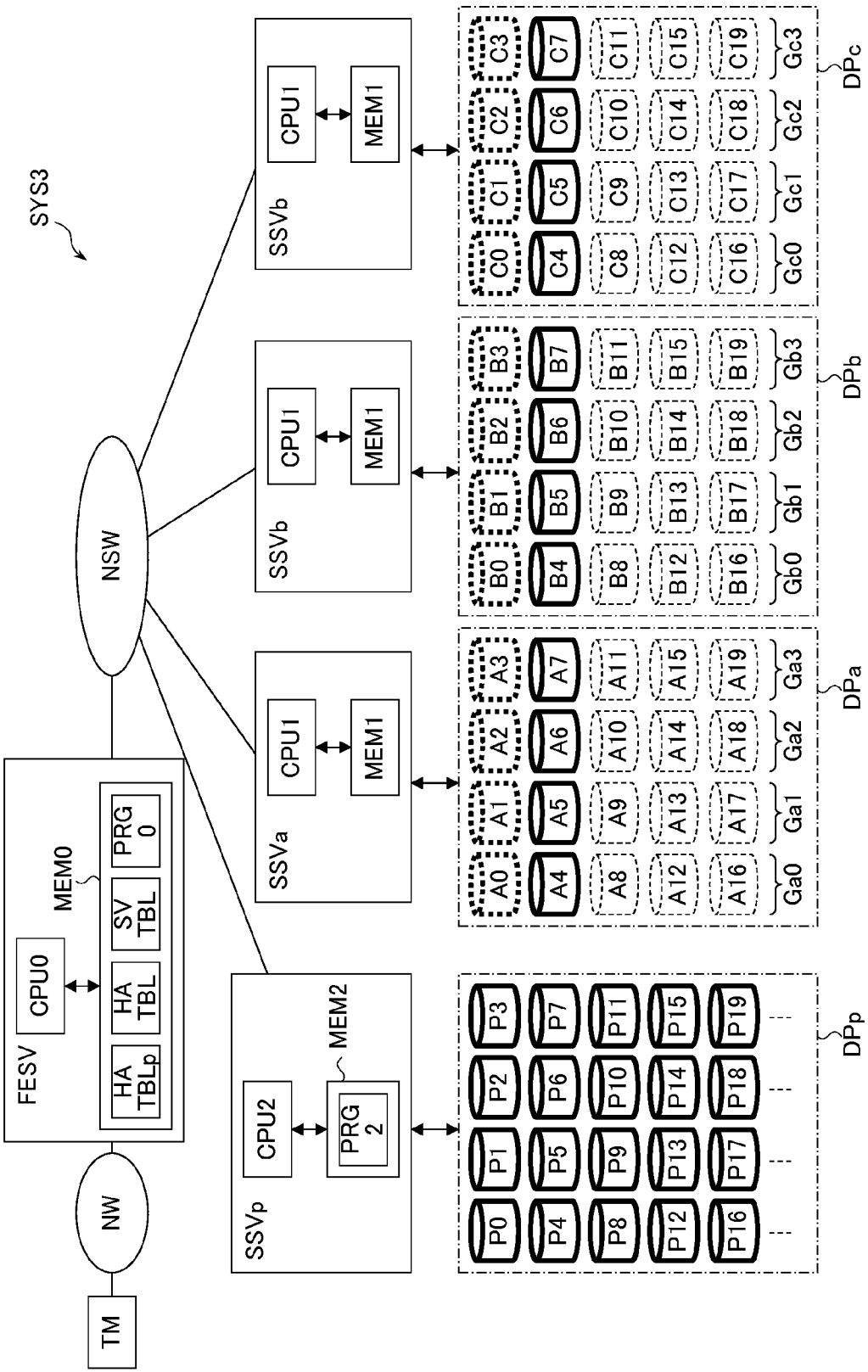
FIG. 20 is a diagram illustrating still another example of the information processing system.

FIG. 20 illustrates still another example of the information processing system. Components same as or similar to components described in FIGS. 1 to 8 are denoted by the same reference numerals, and detailed description thereof will be omitted.

The information processing system SYS3 illustrated in FIG. 20 includes a storage server SSVp and a disk pool DPp in addition to the configuration illustrated in FIG. 1. The storage server SSVp includes a processor CPU2 and a memory MEM2 including an area in which a program PRG2 is stored. The processor CPU2 executes the program PRG2, and realizes a function of the storage server SSVp. The front-end server FESV manages the storage server SSVp in addition to the storage servers SSVa, SSVb, and SSVc.

The disk pool DPp has a plurality of disk devices P (P0 to P19). The disk devices P0 to P19 are set to be in the spin-up state (active state) in order to be indicated by bold solid lines. For example, the disk devices P0 to P19 are allocated to hash spaces different from each other. The front-end server FESV includes a hash table HATBLp for the disk devices P0 to P19 in addition to the hash table HATBL illustrated in FIG. 2. The server table SVTBL is obtained by adding information indicating an IP address of the storage server SSVp to the content thereof illustrated in FIG. 5.

In the information processing system SYS3 illustrated in FIG. 20, data transmitted from the terminal device TM is stored in any one of the disk devices P0 to P19 in accordance with the hash table HATBLp. The data transmitted from the terminal device TM is stored in the disk device A, B, or C which are respectively included in any one of the magnetic disk device groups Ga, Gb, and Gc in accordance with the hash table HATBL. The data stored in the disk device A, B, or C is a replica data of data stored in the disk devices P0 to P19. The information processing system SYS3 illustrated in FIG. 20 operates similarly to FIGS. 9 to 18.

Figure 21:
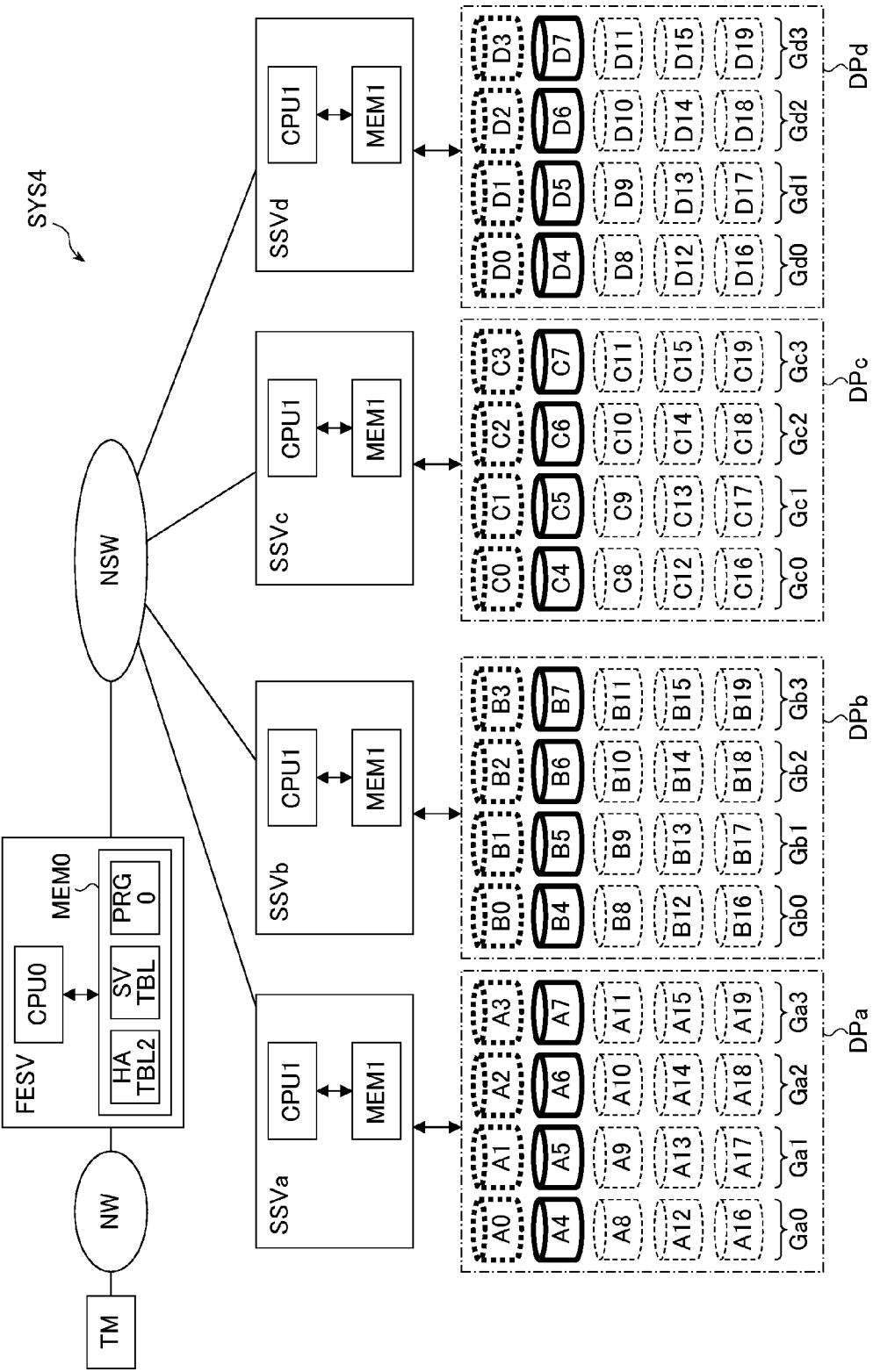
FIG. 21 is a diagram illustrating still another example of the information processing system.

FIG. 21 illustrates still another example of the information processing system. Components same as or similar to components described in FIGS. 1 to 8 are denoted by the same reference numerals, and detailed description thereof will be omitted.

The information processing system SYS4 illustrated in FIG. 21 includes a storage server SSVd and a disk pool DPd in addition to the configuration illustrated in FIG. 1. The configuration and coupling relationship of the storage server SSVd and the disk pool DPd is similar to the configuration and coupling relationship of the storage server SSVa and the disk pool DPa illustrated in FIG. 1. The disk pool DPd has a plurality of magnetic disk device groups Gd (Gd0 to Gd3), each magnetic disk device group including a plurality of disk devices D (D0 to D19).

The front-end server FESV in the information processing system SYS4 includes the hash table HATBL for selecting one of the magnetic disk device groups Ga0 to Ga3, Gb0 to Gb3, and one of the magnetic disk device groups Gc0 to Gc3, Gd0 to Gd3 according to the hash value. That is, the front-end server FESV assigns a request from the terminal device TM to any one of a plurality of the storage servers SSVa, SSVb, SSVc, and SSVd based on the hash table HATBL. The information processing system SYS4 illustrated in FIG. 21 operates similarly to FIGS. 9 to 18.

FIG. 22 illustrates an example of a hash table HATBL2 illustrated in FIG. 21. The hash table HATBL2 includes an area in which information indicating a value having a predetermined number of bits among the hash value obtained by the hash function, and information indicating the magnetic disk device group corresponding to the hash value are stored, as with the hash table HATBL2 illustrated in FIG. 2. The hash table HATBL2 is an example of a request-correspondence table obtained by associating a request from the terminal device TM and magnetic disk device group identification information for identifying each of the magnetic disk device groups Ga and Gb (or Gc and Gd) based on a predetermined function such as the hash function.

For example, data corresponding to a hash value having higher three bits of "000b" ("b" indicates a binary number) is stored in the magnetic disk device groups Ga0 and Gc0. Data corresponding to a hash value having higher three bits of "001b" is stored in the magnetic disk device groups Ga1 and Gc1. Data corresponding to a hash value having higher three bits of "010b" is stored in the magnetic disk device groups Ga2 and Gc2. Data corresponding to a hash value having higher three bits of "011b" is stored in the magnetic disk device groups Ga3 and Gc3. That is, the hash values from "000b" to "011b" are allocated to the magnetic disk device group Ga coupled with the storage server SSVa, and the magnetic disk device group Gc coupled with the storage server SSVc.

The hash values from "100b" to "111b" are allocated to the magnetic disk device group Gb coupled with the storage server SSVb, and the magnetic disk device group Gd coupled with the storage server SSVd. In practice, the front-end server FESV generates, for example, a hash value having 128 bits using Message Digest 5 (MD5) as a hash function.

FIG. 23 illustrates an example of the hash ring of the disk pools DPa and DPb illustrated in FIG. 21. In the disk pools DPa and DPb, the disk device A (or disk device B) allocated to the hash space is changed for every state of ST (ST1, ST2, ST3, and ST4), as in FIG. 4. That is, the disk device A (or disk device B) corresponding to any one of the states ST0 to ST4 is set to be in the active state, and the magnetic disk device A (or disk device B) corresponding to other states is set to be in the inactive state. That is, the disk devices A4 to A7 and B4 to B7 corresponding to the state ST1 indicated by shading are set to be in the active state, and other disk devices A0 to A3, A8 to A19, B0 to B3, and B8 to B19 are set to be in the inactive state.

In the disk pools DPd and DPd, the disk devices C and D allocated to the hash space are also respectively changed for every state ST0 to ST4, as in FIG. 23. In the disk pool DPc, the magnetic disk device C allocated to the hash space may be depicted by substituting the reference sign "C" for the reference sign "A" of the disk device in FIG. 23. Similarly, in the disk pool DPd, the magnetic disk device D allocated to the hash space may be depicted by substituting the reference sign "D" for the reference sign "B" of the magnetic disk device in FIG. 23.

Hereinabove, in the embodiment illustrated in FIGS. 1 to 23, the processor CPU1 does not delete data for each delete request, but collects and deletes data corresponding to entries accumulated in the delete table DELTBL based on that the entries of the data to be deleted that are accumulated with a predetermined amount in the delete table DELTBL. Similarly, the processor CPU1 does not delete data for each occurrence of updating data, but collects and deletes data corresponding to entries accumulated in the delete table DELTBL based on that the entries of the data to be deleted that are accumulated with a predetermined amount in the delete table DELTBL. With this, the frequency of spin-up and spin-down in the disk device may decrease, and thus degradation of the disk device may be suppressed, and lifetime-shortening of the disk device may be suppressed. Power consumption of the disk pool DP may be greatly reduced by decreasing the frequency of spin-up and spin-down in the disk device. Furthermore, efficiency in deletion of data may be improved by collecting and deleting data corresponding to entries accumulated in the delete table DELTBL, compared to when data is deleted for each delete request.

The frequency of causing the storage server SSV to access the disk device may be reduced by collecting and deleting data, and degradation of performance of the storage server SSV may be suppressed due to frequent occurrence of accesses of the disk device. The disk device is not subject to spin-up when the original data stored in the disk device being in the inactive state is moved to the disk device being in the active state in the updating process on the data, and writing, deleting, and reading may be executed that occur next time. In other words, the frequency of spin-up and spin-down decreases, and thus degradation of the disk device may be suppressed, and power consumption may be greatly reduced in the disk pool DP.

In the disk device where there is a vacant area due to the delete process on data may be set to be in the active state, and thus the disk device may be effectively used, compared to when not using a storage area where data is deleted. Accordingly, a utilization ratio of the disk pool DP may be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a plurality of information processing apparatuses;
   a management apparatus that manages the plurality of information processing apparatuses; and
   a device that is to be coupled with the management apparatus,
   wherein each of the plurality of information processing apparatuses includes a plurality of disk device groups,
   each of the plurality of disk device groups includes a plurality of disk devices each of which includes a recording medium and a motor used for accessing the recording medium,
   the management apparatus includes
   a management memory device configured to store first association information and second association information, the first association information associating disk device group identification information identifying the plurality of disk device groups with information processing apparatus identification information identifying the plurality of information processing apparatuses, and the second association information associating a request with the disk device group identification information based on a predetermined function, and
   a management control device configured to assign a first request received from the device to any one of the plurality of disk device groups based on the second association information,
   each of the plurality of information processing apparatuses includes
   a memory device configured to store data management information, state information, and deletion data management information, the data management information associating each of a plurality of the data stored in the plurality of disk devices with data identification information identifying the data, a disk device included in the plurality of disk devices that store the data, and a data size of the data, the state information designating any one of an active state, in which the motor is in a rotating state in the plurality of disk devices included in each of the plurality of disk device groups, and an inactive state, in which the motor stops rotating, and the deletion data management information including deletion data designation information, and a data size of data to be deleted, the deletion data designation information designating the data to be deleted by the first request assigned by the management apparatus, and
   a disk control device configured to execute a deletion process based on the first request assigned by the management apparatus when any one of the plurality of data stored in the plurality of disk devices is to be changed, and when a summation of data sizes included in the deletion data management information exceeds a first threshold value, the deletion process including deleting all the data items to be deleted designated by the deletion data management information, and deleting the deletion data designation information included in the deletion data management information.

2. The information processing system according to claim 1, wherein when the first request assigned by the management apparatus is a request for writing of data to be stored in any one of the disk devices in the inactive state, the data identification information of the stored data is included in the data management information, and the summation of data size included in the deletion data management information exceeds the first threshold value, the disk control device
   deletes all the data items to be deleted designated by the deletion data management information,
   deletes the deletion data designation information included in the deletion data management information,
   updates the data management information,
   updates the state information such that the disk device in the inactive state, in which the data is deleted, is designated to be in the active state,
   stores data from the device in the disk device in the active state that is indicated by the state information, and
   adds to the data management information an entry that includes the data identification information to identify the stored data.

3. The information processing system according to claim 2, wherein when the first request assigned by the management apparatus is a request for writing of data to be stored in any one of the disk devices in the inactive state, the data identification information of the stored data is included in the data management information, and the summation of data size included in the deletion data management information is equal to or less than the first threshold value, the disk control device
   adds the data identification information and the data size to the deletion data management information, stores data from the device in the disk device in the active state, and adds to the data management information an entry that includes the data identification information to identify the stored data.

4. The information processing system according to claim 1, wherein when the first request assigned by the management apparatus is a request for deleting of data stored in the disk device in the inactive state, and the summation of data size is equal to or less than the first threshold value, the disk control device adds the deletion data designation information that designates the data to be deleted and a data size of the data to be deleted, to the deletion data management information corresponding to the disk device that stores the data to be deleted, and deletes from the data management information an entry that includes the data identification information to identify the data to be deleted.

5. The information processing system according to claim 1, wherein when the first request assigned by the management apparatus is a request for deleting of data stored in the disk device in the active state, the disk control device deletes the data to be deleted, and deletes from the data management information an entry that includes the data identification information of the data to be deleted.

6. The information processing system according to claim 1, wherein when the first request assigned by the management apparatus is a request for writing of data that is stored in none of the disk devices, the disk control device stores data from the device in the disk device in the active state, and adds to the data management information an entry that includes the data identification information to identify the written data.

7. The information processing system according to claim 1, wherein when data is stored in the disk device in the active state, and thus a summation of data sizes of the data that are stored by the disk device in the active state exceeds a second threshold value, the disk control device sets the disk device in the active state to be in the inactive state, sets to be in the active state any one of the disk devices capable of storing data among the disk devices in the inactive state, and updates the state information.

8. The information processing system according to claim 1, wherein the state information includes order information to designate an order of setting the disk devices in the inactive state to be in the active state, and the disk control device sets the disk device in the inactive state to be in active state, based on the order information.

9. The information processing system according to claim 1, wherein the disk control device updates the state information such that the disk device in the inactive state in which the data is deleted is set to be in the active state next time when the summation of data size exceeds the first threshold value, and all the data to be deleted designated by the deletion data management information are deleted.

10. The information processing system according to claim 1, wherein the disk control device updates the state information such that the disk device in the inactive state in which the data is deleted is set to be in the active state at the last among the disk devices that are in the inactive state and capable of storing data when the summation of data size exceeds the first threshold value, and all the data items to be deleted designated by the deletion data management information are deleted.

11. The information processing system according to claim 1, wherein the disk control device changes the disk device in the inactive state in which the data to be deleted is stored to be in the active state when the data to be deleted is deleted based on the summation of data size greater than the first threshold value.

12. The information processing system according to claim 1, wherein when the first request assigned by the management apparatus is a request for reading of the data that is stored in any one of the disk devices, the disk control device searches for the data management information based on the data identification information of a data to be read, and reads out the data from the disk device that stores the data to be read.

13. The information processing system according to claim 12, wherein the disk control device holds information of the data to be deleted at the time of deleting or updating of data in the disk device that is in the inactive state when the disk device which stores the data to be read is set to be in the inactive state, and sets the disk device to be in the active state and deletes the data when the summation of the data sizes of the data to be deleted exceeds a predetermined amount.

14. A control method of an information processing system that includes a plurality of information processing apparatuses, a management apparatus to manage the plurality of information processing apparatuses, and a device to be coupled with the management apparatus, each of the plurality of information processing apparatuses including a plurality of disk device groups, each of the plurality of disk device groups including a plurality of disk devices each of which includes a recording medium and a motor used for accessing the recording medium, the method comprising:

holding, by the management apparatus, a first association information and a second association information, the first association information associating disk device group identification information identifying the plurality of disk device groups with information processing apparatus identification information identifying the plurality of information processing apparatuses, and the second association information associating a request with the disk device group identification information based on a predetermined function;

assigning, by the management apparatus, a first request received from the device to any one of the plurality of disk device groups based on the second association information;

holding, by each of the plurality of information processing apparatuses, data management information, state information, and deletion data management information, the data management information associating each of a plurality of the data stored in the plurality of disk devices with data identification information identifying the data, a disk device included in the plurality of disk devices that store the data, and a data size of the data, the state information designating any one of an active state, in which the motor is in a rotating state in the plurality of disk devices included in each of the plurality of disk device groups, and an inactive state, in which the motor stops rotating, and the deletion data management information including deletion data designation information, and a data size of a data to be deleted, the deletion data designation information designating the data to be deleted by the first request assigned by the management apparatus; and executing, by each of the plurality of information processing apparatuses, deletion process based on the first request assigned by the management apparatus when any one of the plurality of data stored in the plurality of disk devices is to be changed, and when a summation of data sizes included in the deletion data management information exceeds a first threshold value, the deletion process including deleting all the data items to be deleted designated by the deletion data management information, and deleting the deletion data designation information included in the deletion data management information.

15. A non-transitory computer-readable storage medium storing a program that causes an information processing system to execute a process, the information processing system including a plurality of information processing apparatuses, a management apparatus to manage the plurality of information processing apparatuses, and a device to be coupled with the management apparatus, each of the plurality of information processing apparatuses including a plurality of disk device groups, each of the plurality of disk device groups including a plurality of disk devices each of which includes a recording medium and a motor used for accessing the recording medium, the process comprising:

causing the management apparatus to hold a first association information and a second association information, the first association information associating disk device group identification information identifying the plurality of disk device groups with information processing apparatus identification information identifying the plurality of information processing apparatuses, and the second association information associating a request with the disk device group identification information based on a predetermined function;

causing the management apparatus to assign a first request received from the device to any one of the plurality of disk device groups based on the second association information;

causing each of the plurality of information processing apparatuses to hold data management information, state information, and deletion data management information, the data management information associating each of a plurality of the data stored in the plurality of disk devices with data identification information identifying the data, a disk device included in the plurality of disk devices that store the data, and a data size of the data, the state information designating any one of an active state, in which the motor is in a rotating state in the plurality of disk devices included in each of the plurality of disk device groups, and an inactive state, in which the motor stops rotating, and the deletion data management information including deletion data designation information, and a data size of a data to be deleted, the deletion data designation information designating the data to be deleted by the first request assigned by the management apparatus; and causing each of the plurality of information processing apparatuses to execute deletion process based on the first request assigned by the management apparatus when any one of the plurality of data stored in the plurality of disk devices is to be changed, and when a summation of data sizes included in the deletion data management information exceeds a first threshold value, the deletion process including deleting all the data items to be deleted designated by the deletion data management information, and deleting the deletion data designation information included in the deletion data management information.

* * * * *